United States Patent
Noguchi et al.

(10) Patent No.: US 7,205,919 B2
(45) Date of Patent: Apr. 17, 2007

(54) DIGITAL SIGNAL PROCESSING APPARATUS AND DIGITAL SIGNAL PROCESSING METHOD

(75) Inventors: Masayoshi Noguchi, Chiba (JP); Gen Ichimura, Tokyo (JP); Nobukazu Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 217 days.

(21) Appl. No.: 11/073,629

(22) Filed: Mar. 8, 2005

(65) Prior Publication Data

US 2005/0213669 A1    Sep. 29, 2005

(30) Foreign Application Priority Data

Mar. 24, 2004  (JP) .............................. 2004-087721

(51) Int. Cl.
 *H03M 1/66* (2006.01)

(52) U.S. Cl. ..................... 341/144; 341/143; 341/141; 381/94.1; 700/94

(58) Field of Classification Search ................. 341/76, 341/143, 144; 700/94; 381/94.1; 704/215, 704/226

See application file for complete search history.

(56) References Cited

U.S. PATENT DOCUMENTS

| 5,793,316 A * | 8/1998 | Noguchi et al. ............... 341/77 |
| 6,400,294 B1 * | 6/2002 | Ichimura et al. ............ 341/143 |
| 6,456,966 B1 * | 9/2002 | Iwabuchi ..................... 704/212 |
| 2003/0023332 A1 * | 1/2003 | Sugiyama et al. ............ 700/94 |
| 2003/0179116 A1 * | 9/2003 | Oki .............................. 341/61 |

\* cited by examiner

*Primary Examiner*—Howard L. Williams
(74) *Attorney, Agent, or Firm*—Oblon, Spivak, McClelland, Maier & Neustadt, P.C.

(57) ABSTRACT

The present invention aims to realize linking of 1-bit signals having respective sampling frequencies that are different from each other and show a relationship of one equal to integer times of the other without noises.

6 Claims, 18 Drawing Sheets

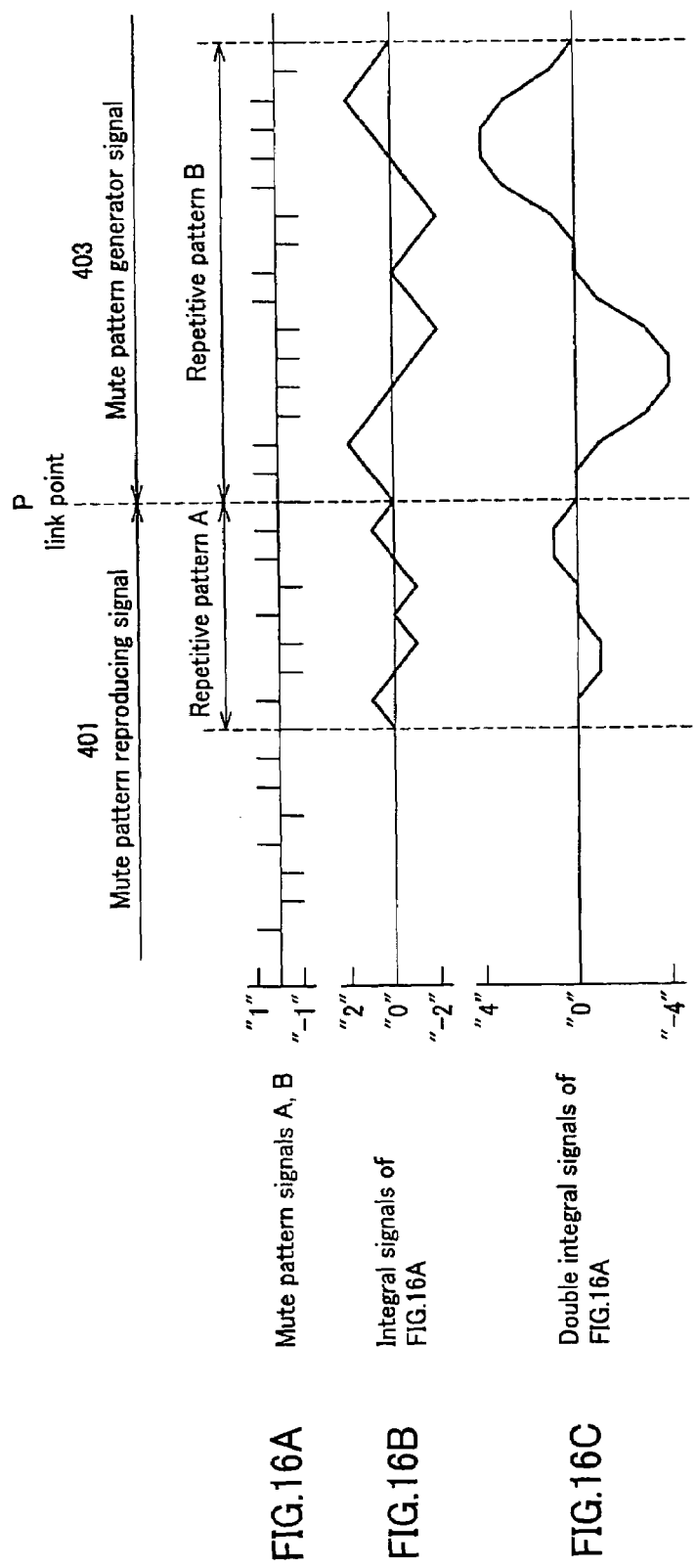

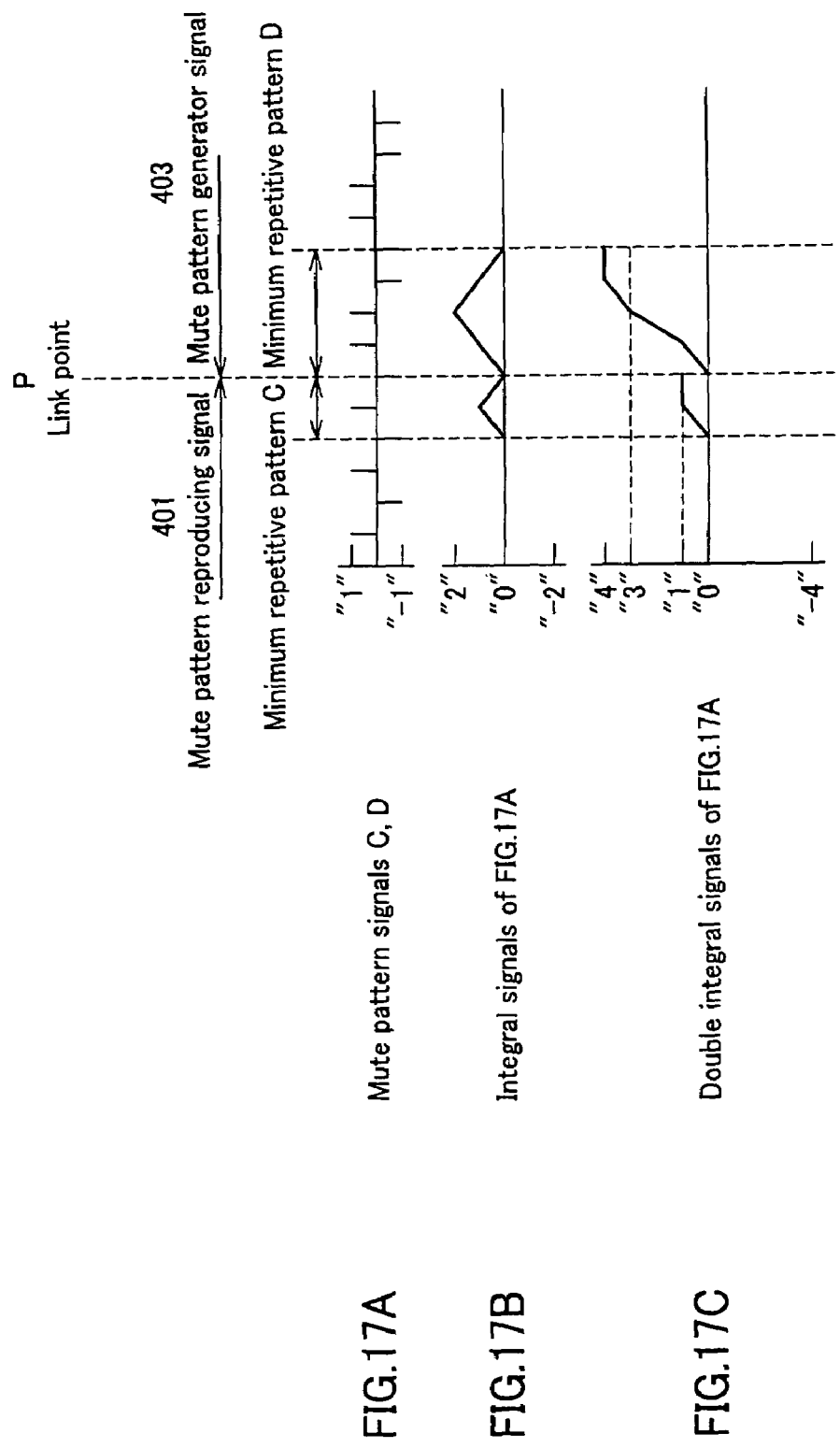

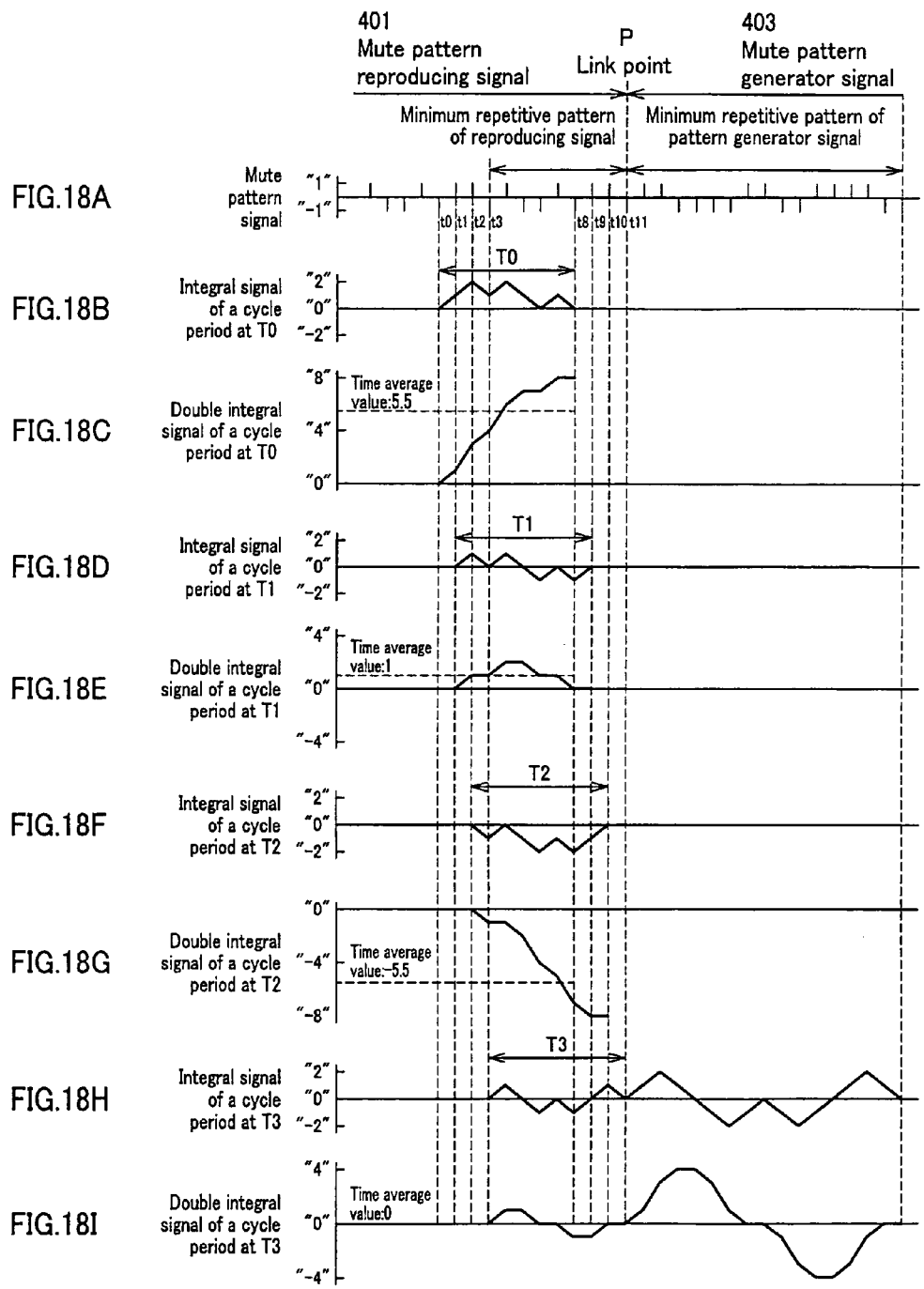

DIGITAL SIGNAL PROCESSING APPARATUS AND DIGITAL SIGNAL PROCESSING METHOD

BACKGROUND OF THE INVENTION

1. Field of the Invention

This invention generally relates to a method and an apparatus for processing digital signals. More particularly, the present invention relates to a digital signal processing apparatus and a digital signal processing method for conducting a signal switching process on $\Delta\Sigma$-modulated digital audio signals.

This application claims priority of Japanese Patent Application No. 2004-087721, filed on Mar. 24, 2004, the entirety of which is incorporated herein by reference.

2. Description of Related Art

Delta-sigma ($\Delta\Sigma$)-modulated high speed 1-bit signals are characterized by a very high sampling frequency and a short data word length if compared with conventional so-called multi-bit digital signals that have been and are being used for digital audio applications. More specifically, such a 1-bit signal has a sampling frequency sixty four (64) times higher than that of a multi-bit digital signal whose sampling frequency and data word length are respectively 44.1 kHz and 16 bits. Additionally, such a signal can ensure a high dynamic range in the conventional audio band (20 kHz) that is a low band relative to the excessively high sampling frequency of sixty four times of the conventional sampling frequency due to $\Sigma\Delta$ modulation if it is a 1-bit signal. Thus, such 1-bit signals can find applications in the field of high sound quality recorders and that of data transmission by effectively exploiting the characteristic properties.

FIG. 1 of the accompanying drawings schematically illustrates the configuration of a 1-bit $\Delta\Sigma$ modulator 60 for generating a 1-bit audio data. The $\Delta\Sigma$ modulator 60 comprises an adder 62, an integrator 63, a 1-bit quantizer 64 and a 1-sample delay unit 65. The addition output of the adder 62 is fed to the integrator 63 and the integration output of the integrator 63 is fed to the 1-bit quantizer 64. The quantization output of the 1-bit quantizer 64 is led out from an output terminal 66 and at the same time prefixed by a negative sign, fed back to the adder 62 by way of the 1-sample delay unit 65 and added to the analog audio signal supplied from an input terminal 61. The addition output of the adder 62 is integrated by the integrator 63. Since the integration output of the integrator 63 is quantized by the 1-bit quantizer 64 for each sampling period, it is possible to output a 1-bit quantized data, or a 1-bit audio data, from the output terminal 66.

Circuits designed for $\Delta\Sigma$ modulation are not technically particularly new. Such circuits have been and being popularly used in A/D converters because they can suitably be put into ICs and it is relatively easy to achieve a satisfactory level of accuracy of A/D conversion by using such a circuit. A signal subjected to $\Sigma\Delta$ modulation can be put back into an analog audio signal after passing it through a simple analog low-pass filter.

Meanwhile, super audio CDs (SACDs) storing 1-bit audio signals of the direct stream digital (DSD) system formed by using digital audio signals generated by the $\Sigma\Delta$ modulator that are weighted by "1" vs "−1" are provided with a 2-channel recording area and a multi-channel recording area that are different from each other. When multi-channel signals are reproduced by means of a 2-channel apparatus or a headphone they have to be converted into 2-channel signals by way of a down-mixing process.

Optical disc players for replaying super audio CDs are adapted to decode the data stored on the optical discs into 1-bit reproduced signals of 64 fs. A down-mixing process is used to reproduce multi-channel signals by way of 2-channels. Reproduced signals and down-mixed signals show the same rate if the down-mixing process is conducted at a rate of 64 fs.

A 1-bit signal switching processor is used for switching 1-bit audio signals of the same rate coming from the two different systems. FIG. 2 of the accompanying drawings is a schematic circuit diagram of a known 1-bit signal switching processor 70. FIG. 3 of the accompanying drawings is a flow chart illustrating the operation of the 1-bit signal switching processor 70.

The 1-bit signal switching processor 70 comprises a changeover switch 71 for switching from a reproduced signal 102 with a sampling frequency of 64 fs to a down-mixed signal 103 of 64 fs or vice versa, a mute pattern generator 73 for generating a mute pattern signal 104 with a sampling frequency of 64 fs and a controller 74 for supplying a switching control signal according to a switching request signal 101 from the system controller of an optical disc player to the mute pattern generator 73. The 1-bit signal switching processor 70 additionally comprises a cross-fade processor 72 for cross-fading a reproduced signal 102 with a sampling frequency of 64 fs into a mute pattern signal 104 with a sampling frequency of 64 fs at a rate of 64 fs, which is equal to the sampling frequency, and also cross-fading from a mute pattern signal 104 a down-mixed signal 103 with a sampling frequency of 64 fs into a reproduced signal 102 with a sampling frequency of 64 fs at a rate of 64 fs, which is equal to the sampling frequency.

The 1-bit signal switching processor 70 further comprises a first coefficient multiplier 75 for multiplying a reproduced signal 102 with a sampling frequency of 64 fs or a down-mixed signal 103 with a sampling frequency of 64 fs by the multiplication coefficient (cross-fade gain) k supplied from the controller 74 and varying the amplitude level to produce a multi-bit data, a second coefficient multiplier 76 for multiplying a mute pattern signal 104 with a sampling frequency of 64 fs generated by the mute pattern generator 73 by the coefficient (1−k) obtained by subtracting the multiplication coefficient (cross-fade gain) k supplied from the controller 74 from 1 and varying the amplitude level to produce a multi-bit data and an adder 77 for adding the multiplication output of the first coefficient multiplier 75 and the multiplication output of the second coefficient multiplier 76.

The cross-fade processor 72 by turn comprises a $\Delta\Sigma$ modulator 78 for conducting a re-$\Delta\Sigma$ modulation process on the addition output from the adder 77 and outputting a 1-bit audio data (cross-fade signal) with a sampling frequency of 64 fs and a changeover switch 79 for switching a reproduced signal 102 with a sampling frequency of 64 fs or a down-mixed signal 103 with a sampling frequency of 64 fs, the output data (cross-fade signal 105 with a sampling frequency of 64 fs) from the $\Delta\Sigma$ modulator 78 and the mute pattern signal 104 with a sampling frequency of 64 fs from the mute pattern generator 73 under the control of the controller 74.

Now, the operation of the 1-bit signal switching processor 70 will be described by referring to FIG. 3. Upon receiving a switching request signal 101, the cross-fade processor 72 cross-fades the 64 fs reproduced signal 102 into the mute pattern generated by the mute pattern generator 73 to smoothly switch from the 64 fs reproduced signal 102 to a 64 fs cross-fading signal 105a and then to the 64 fs mute pattern 104. The cross-fading technique that the cross-fade processor uses for a 1-bit signal that can be used here has already been patented to the applicant of this patent application (Japanese Patent No. 3318823). As a 64 fs mute pattern 104 is output, the controller 74 generates a switching signal 107 to switch the input signal from the 64 fs reproduced signal 102 to the 64 fs down-mixed signal 103. The disc player switches from the two-channel replay to the multi-channel replay. Thereafter, the cross-fade processor 72 cross-fades from the 64 fs down-mixed signal 103 into the 64 fs mute pattern signal 104 and so that the obtained 64 fs cross-fade signal 105b is smoothly switched to the 64 fs down-mixed signal 103. The cross-fade processor 72 is a switching device for switching signals with the same sampling frequency and all the processing operations are performed with 64 fs.

With an optical disc such as a super audio CD that stores $\Delta\Sigma$-modulated high speed 1-bit audio signals, the mute pattern stored on the disc is reproduced as it is when the mute region is used for reproduction but it has to be switched to the mute pattern generated by the mute pattern generator when the signal reproduction is stopped.

FIG. 4 of the accompanying drawings is a schematic circuit diagram of a known 1-bit signal switching processor 80 adapted to switch to the mute pattern generated by the mute pattern generator when the signal reproduction is stopped. FIG. 5 of the accompanying drawings is a timing chart illustrating the operation of the 1-bit signal switching processor 80.

The 1-bit signal switching processor 80 comprises a mute pattern generator 81 for generating a mute pattern signal 203 with a sampling frequency of 64 fs and a controller 82 for supplying a switching control signal to cross-fade processor 83, which will be described later, according to the switching request signal 201 supplied from the system controller of the optical disc player. The cross-fade processor 83, the configuration of which will be described hereinafter, cross-fades the reproduced signal 202 with a sampling frequency of 64 fs into the mute pattern signal 203 with a sample frequency of 64 fs at a rate of 64 fs, which is equal to the sampling frequency, to generate a cross-fade signal 204.

The cross-fade processor 83 by turn comprises a first coefficient multiplier 84 for multiplying a reproduced signal 202 with a sampling frequency of 64 fs by the multiplication coefficient (cross-fade gain) k supplied from the controller 82 and varying the amplitude level to produce a multi-bit data, a second coefficient multiplier 85 for multiplying a mute pattern signal 203 with a sampling frequency of 64 fs generated by the mute pattern generator 81 by the coefficient (1−k) obtained by subtracting the multiplication coefficient (cross-fade gain) k supplied from the controller 82 from 1 and varying the amplitude level to produce a multi-bit data and an adder 86 for adding the multiplication output of the first coefficient multiplier 84 and the multiplication output of the second coefficient multiplier 85.

The cross-fade processor 83 further comprises a $\Delta\Sigma$ modulator 87 for conducting a re-$\Delta\Sigma$ modulation process on the addition output from the adder 86 and outputting a 1-bit audio data with a sampling frequency of 64 fs and a changeover switch 88 for switching a reproduced signal 202 with a sampling frequency of 64 fs, the output data (cross-fade signal 204 with a sampling frequency of 64 fs) from the $\Delta\Sigma$ modulator 87 and the mute pattern signal 203 with a sampling frequency of 64 fs from the mute pattern generator 81 under the control of the controller 82.

Now, the operation of the 1-bit signal switching processor 80 will be described by referring to FIG. 5. Upon receiving a switching request signal 201, the cross-fade processor 83 cross-fades the 64 fs reproduced signal 202 into the mute pattern signal 203 generated by the mute pattern generator 81 to smoothly switch from the 64 fs reproduced signal 202 to a 64 fs cross-fading signal 204 and then to the 64 fs mute pattern 203. The cross-fading technique of Japanese Patent No. 3318823 that is patented to the applicant of this patent application is used here for the cross-fade processor for cross-fading a 1-bit signal.

With an optical disc that stores $\Delta\Sigma$-modulated high speed 1-bit audio signals, the mute pattern stored on the disc is reproduced as it is when the mute region is used for reproduction but it has to be switched to the mute pattern generated by the mute pattern generator when the signal reproduction is stopped. A data stored on the super audio CD is decoded to a 1-bit reproduced signal by means of a decoder at the time of signal reproduction and a mute pattern is output at the time when the signal reproduction is stopped. A 1-bit signal switching processor is sued for switching a 1-bit signal.

In the case of an optical disc such as a super audio CD provided with a 2-channel recording area and a multi-channel recording area that are different form each other, multi-channel signals have to be converted into 2-channel signals by way of a down-mixing process when they are reproduced by means of a 2-channel apparatus or a headphone as pointed out above. In high sound quality systems, the above process is conducted in a 1-bit domain and a processing technique using a rate of 128 fs, which is twice as high as the recorded sampling frequency of 64 fs, is available for improving the sound quality of the sound processed in a 1-bit domain. With this technique, it is possible to convert a multi-channel signal into a 2-channel signal with a sampling frequency of 128 fs in order to achieve a higher sound quality. On the other hand, however, the above process is not necessary when 2-channel signals are reproduced. In other words, a 2-channel signal with a sampling frequency of 64 fs needs to be reproduced directly. Thus, signals of two different types, those with a sampling frequency of 64 fs and those with a sampling frequency of 128 fs, coexist in a single system. When two different 1-bit signals are directly linked, there arises a problem that noises can appear at the boundary.

Additionally, the arrangement of FIG. 4 where the mute pattern generated by the mute pattern generator is selected when the signal reproduction is stopped entails a problem of requiring a large hardware arrangement.

SUMMARY OF THE INVENTION

In view of the above identified circumstances, it is therefore an object of the present invention to provide a digital signal processing apparatus and a digital signal processing method that can realize a system where a plurality of sampling frequencies coexist by linking 1-bit signals having respective sampling frequencies that are different from each other and show a relationship of one equal to integer times of the other.

Another object of the present invention is to provide a digital signal processing apparatus and a digital signal processing method that can realize a digital mute with a simple arrangement by linking 1-bit mute patterns of two different systems without noises.

In an aspect of the present invention, the above objects and other objects of the invention are achieved by providing a digital signal processing apparatus for processing 1-bit digital audio signals of at least two different systems weighted by "1" vs "−1" at high speed, the apparatus comprising: a mute pattern signal generating means for generating mute pattern signals of at least two different systems obtained by repetitively arranging a pattern with different weights of the same number; and a control means for supplying a switching signal to the mute pattern signal generating means based on a switching request signal; the mute pattern signal generating means being adapted to link high speed sampling 1-bit digital audio signals of at least two systems by switching mute pattern signals of the at least two systems from one to the other in response to the switching signal supplied from the control means, double integral signals of minimum repetitive patterns of the mute pattern signals showing the same time average value.

Thus, the mute pattern signal generating means links high speed sampling 1-bit digital audio signals of at least two systems by switching mute pattern signals of at least two systems from one to the other in response to a switching signal supplied form the control means provided that the double integral signals of minimum repetitive patterns of the mute pattern signals show the same time average value.

In another aspect of the present invention, there is provided a digital signal processing apparatus for processing 1-bit digital audio signals of two systems weighted by "1" vs "−1" at high speed and having respective sampling frequencies showing a relationship of one equal to integer times of the other, the apparatus comprising: a mute pattern signal generating means for generating mute pattern signals of two systems having different respective sampling frequencies with a relationship of 1: (1/m) (m being an integer not smaller than 2), using respective mute patterns having weights of the same number, one taking the same value continuously by a unit of m samples; and a control means for supplying a switching signal to the mute pattern signal generating means based on a switching request signal; the mute pattern signal generating means being adapted to link high speed sampling 1-bit digital audio signals of two systems by switching mute pattern signals of the two systems from one to the other in response to the switching signal supplied from the control means, double integral signals of minimum repetitive patterns of the mute pattern signals showing the same time average value.

Thus, the mute pattern signal generating means links high speed sampling 1-bit digital audio signals of at least two systems by switching mute pattern signals of at least two systems from one to the other in response to a switching signal supplied from the control means provided that the double integral signals of minimum repetitive patterns of the mute pattern signals show the same time average value.

For example, a disc reproduced signal with a sampling frequency of 64 fs is cross-faded into a 64 fs rate mute pattern of a rate of 64 fs by means of a cross-fade processor. Then, the 64 fs rate mute pattern is switched to a 128 fs rate mute pattern. Noise components in the audio frequency band can be suppressed sufficiently at the link point by using mute patterns that satisfy a specific requirement when they are linked to each other. Thus, mute patterns with different respective sampling frequencies are linked. Thereafter, the 128 fs rate mute pattern is cross-faded into a 128 fs rate signal to consequently switch from a 64 fs rate audio signal to a 128 fs rate signal. A 128 fs rate signal can be switched to a 64 fs rate signal in a similar manner. Thus, the objects of the present invention are achieved as signals with different respective sampling frequencies are switched from one to the other.

In still another aspect of the present invention, there is provided a digital signal processing apparatus for processing 1-bit digital audio signals of two systems weighted by "1" vs "−1" at high speed and having the same sampling frequency, the apparatus comprising: a mute pattern signal detecting means for detecting a first mute pattern signal from the input 1-bit audio reproduced signal; a double integrating means for performing an operation of double integration on the data of a cycle period of the first mute pattern signal detected by the mute pattern signal detecting means; an average value detecting means for detecting the average value of the double integral values obtained by the double integrating means; a mute pattern signal generating means for generating a second mute pattern signal having a sampling frequency same as that of the first mute pattern signal and showing an average value of the double integral values of the data of a cycle period getting to a predetermined value; a switching means for switching from the input 1-bit audio reproduced signal to the second mute pattern signal generated by the mute pattern signal generating means; and a control means for controlling the switching operation of the switching means at the timing of detection of the average value of the double integral values of the first mute pattern signal detected by the average value detecting means getting to the predetermined value so as to switch from the 1-bit audio reproduced signal to the second mute pattern signal.

Thus, the mute pattern signal generating means generates a second mute pattern signal having a sampling frequency same as that of the first mute pattern signal and showing an average value of the double integral values of the data of a cycle period that gets to a predetermined value and the control means controls the switching operation of the switching means at the timing of detection of the average value of the double integral values of the first mute pattern signal detected by the average value detecting means that gets to the predetermined value so as to switch from the 1-bit audio reproduced signal to the second mute pattern signal.

In other words, the mute pattern detecting means detects a mute pattern that is formed by repeating the same pattern from the reproduced signal and the average value detecting means detects the time average value of the double integral values of the mute pattern. The mute pattern signal generating means generates a mute pattern showing a time average value of the double integral values that gets to the above first average value. The two mute patterns are switched from one to the other at the timing when the time average values of the two signals become equal to each other. As a result, it is possible to from a mute pattern to a different mute pattern with a simple arrangement to achieve the objects of the present invention.

In still another aspect of the present invention, the above objects and other objects of the invention are achieved by providing a digital signal processing method for processing 1-bit digital audio signals of at least two different systems weighted by "1" vs "−1" at high speed, the method comprising: a mute pattern signal generating step of generating mute pattern signals of at least two different systems obtained repetitively arranging a pattern with different weights of the same number; the mute pattern signal generating step being adapted to link high speed sampling 1-bit digital audio signals of at least two systems by switching mute pattern signals of the at least two systems from one to the other in response to a switching signal, the double integral signals of minimum repetitive patterns of the mute pattern signals showing the same time average value.

Thus, the mute pattern signal generating step is adapted to link high speed sampling 1-bit digital audio signals of at least two systems by switching mute pattern signals of at least two systems from one to the other provided that the double integral signals of minimum repetitive patterns of the mute pattern signals show the same time average value.

In still another aspect of the present invention, there is provided a digital signal processing method for processing 1-bit digital audio signals of two systems weighted by "1" vs "−1" at high speed and having respective sampling frequencies showing a relationship of one equal to integer times of the other, the method comprising: a mute pattern signal generating step of generating mute pattern signals of two systems having different respective sampling frequencies with a relationship of 1: (1/m) (m being an integer not smaller than 2), using respective mute patterns having weights of the same number, one taking the same value continuously by a unit of m samples; the mute pattern signal generating step being adapted to link high speed sampling 1-bit digital audio signals of at least two systems by switching mute pattern signals of the two systems from one to the other in response to a switching signal, the double integral signals of minimum repetitive patterns of the mute pattern signals showing the same time average value.

Thus, the mute pattern signal generating step is adapted to link high speed sampling 1-bit digital audio signals of at least two systems by switching mute pattern signals of at least two systems from one to the other provided that the double integral signals of minimum repetitive patterns of the mute pattern signals show the same time average value.

In another aspect of the present invention, there is provided a digital signal processing method for processing 1-bit digital audio signals of two systems weighted by "1" vs "−1" at high speed and having the same sampling frequency, the method comprising: a mute pattern signal detecting step of detecting a first mute pattern signal from the input 1-bit audio reproduced signal; a double integrating step of performing an operation of double integration on the data of a cycle period of the first mute pattern signal detected in the mute pattern signal detecting step; an average value detecting step of detecting the average value of the double integral values obtained in the double integrating step; a mute pattern signal generating step of generating a second mute pattern signal having a sampling frequency same as that of the first mute pattern signal and showing an average value of the double integral values of the data of a cycle period getting to a predetermined value; and a switching step of switching from the input 1-bit audio reproduced signal to the second mute pattern signal generated in the mute pattern signal generating step; the switching step being adapted to switch from the 1-bit audio reproduced signal to the second mute pattern signal at the timing of detection of the average value of the double integral values of the first mute pattern signal detected in the average value detecting step getting to the predetermined value.

Thus, the mute pattern signal generating step is adapted to generate a second mute pattern signal having a sampling frequency same as that of the first mute pattern signal and showing an average value of the double integral values of the data of a cycle period that gets to a predetermined value. The switching operation is so controlled that it is performed at the timing of detection of the average value of the double integral values of the first mute pattern signal detected in the average value detecting step that gets to the predetermined value so as to switch from the 1-bit audio reproduced signal to the second mute pattern signal.

In a digital signal processing apparatus according to the invention as mentioned first, the mute pattern signal generating means links high speed sampling 1-bit digital audio signals of at least two systems by switching mute pattern signals of at least two systems from one to the other in response to a switching signal supplied from the control means provided that the double integral signals of minimum repetitive patterns of the mute pattern signals show the same time average value. Therefore, it is possible to switch 1-bit signals of at least two systems without generating noises.

In a digital signal processing apparatus according to the invention as mentioned second, the mute pattern signal generating means links high speed sampling 1-bit digital audio signals of two systems by switching mute pattern signals of two systems from one to the other in response to a switching signal supplied from the control means provided that the double integral signals of minimum repetitive patterns of the mute pattern signals show the same time average value. Therefore, it is possible to switch 1-bit signal with different respective sampling frequencies without generating noises.

In a digital signal processing apparatus according to the invention as mentioned third, the mute pattern signal generating means generates a second mute pattern having a sampling frequency same as that of the first mute pattern signal and showing an average value of the double integral values of the data of a cycle period that gets to a predetermined value and the control means controls the switching operation of the switching means at the timing of detection of the average value of the double integral values of the first mute pattern signal detected by the average value detecting means that gets to the predetermined value so as to switch from the 1-bit audio reproduced signal to the second mute pattern signal. Therefore, it is possible to directly switch 1-bit mute patterns without generating noises provided that the time average values of the double integral signals of the mute patterns are equal to each other.

In a digital signal processing method according to the invention as mentioned first, the mute pattern signal generating step is adapted to link high speed sampling 1-bit digital audio signals of at least two systems by switching mute pattern signals of at least two systems from one to the other provided that the double integral signals of minimum repetitive patterns of the mute pattern signals show the same time average value. Therefore, it is possible to switch 1-bit signals of at least two systems without generating noises.

In a digital signal processing method according to the invention as mentioned second, the mute pattern signal generating step is adapted to link high speed sampling 1-bit digital audio signals of two systems by switching mute pattern signals of two systems from one to the other provided that the double integral signals of minimum repetitive patterns of the mute pattern signals show the same time average value. Therefore, it is possible to switch 1-bit signals with different respective sampling frequencies without generating noises.

In a digital signal processing method according to the invention as mentioned third, the mute pattern signal generating step is adapted to generate a second mute pattern signal having a sampling frequency same as that of the first mute pattern signal and showing an average value of the double integral values of the data of a cycle period that gets to a predetermined value. The switching operation is so controlled that it is performed at the timing of detection of the average value of the double integral values of the first mute pattern signal detected in the average value detecting step that gets to the predetermined value so as to switch from the 1-bit audio reproduced signal to the second mute pattern signal. Therefore, it is possible to directly switch 1-bit mute patterns without generating noises provided that the time average values of the double integral signals of the mute patterns are equal to each other.

BRIEF DESCRIPTION OF THE DRAWINGS

FIGS. 16A through 16C are graphs illustrating the integrated waveform of a mute pattern;

FIGS. 17A through 17C are graphs illustrating the integrated waveform of another mute pattern; and FIGS. 18A through 18I are graphs illustrating the transition of the time average value of double integrals of a mute pattern.

DETAILED DESCRIPTION OF THE PREFERRED EMBODIMENTS

Figure 6:
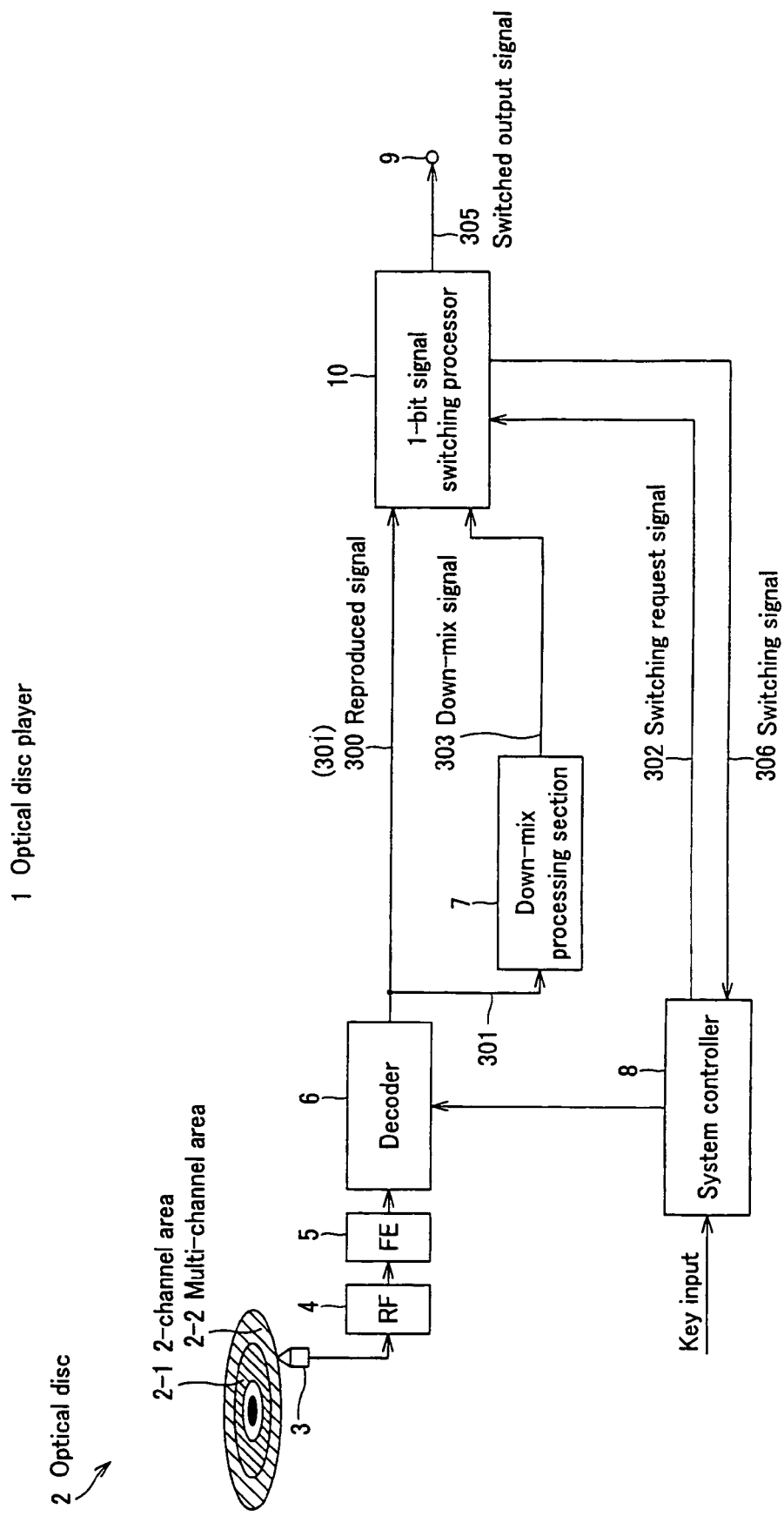
FIG. 6 is a schematic block diagram of an optical disc player containing an embodiment of 1-bit signal switching processor according to the invention, illustrating the system configuration thereof.

Now, the present invention will be described in greater detail by referring to the accompanying drawings that illustrate preferred embodiments of the invention. FIG. 6 is a schematic block diagram of an optical disc player 1 containing an embodiment of 1-bit signal switching processor 10 according to the invention, which shows the configuration of the processor 10 and illustrates a digital signal processing apparatus and a digital signal processing method according to the invention.

An optical disc 2 that the optical disc player 1 can play is a super audio CD (SACD) storing digital audio signals that are weighted by "1" vs "−1", which signals may typically be 1-bit audio data of a direct stream digital system generated by ΔΣ modulation.

Particularly, the optical disc 2 has a 2-CH area 2-1 where music is recorded in stereo 2 channels, using 1-bit audio data of a DSD system generated with a sampling frequency of 64 fs and a multi-CH area 2-2 where music is recorded in a plurality of channels (e.g., 6 channels), using audio data of the DSD system, also generated with a sampling frequency of 64 fs.

The 2-CH area and the multi-CH area may not necessarily be formed as different areas on the same plane. Alternatively, they may be formed respectively on two different signal recording layers. Still alternatively, the 2-CH area may be formed on the first layer and the multi-CH area may be formed on the remaining part of the first layer and the second layer.

The 2-CH area 2-1 where music is recorded in stereo 2 channels is an area where 1-bit audio data are recorded so as to reproduce the acoustic status quo of a studio or a music hall that is recorded by way of a plurality of microphones arranged in the studio or the music hall, whichever appropriate, by way of a pair of speakers arranged left and right in front of a listener. The multi-CH area 2-2 where music is recorded in plurality of channels is an area where 1-bit audio data are recorded so as to reproduce the acoustic status quo of a studio or a music hall that is recorded by way of a plurality of microphones arranged in the studio or the music hall, whichever appropriate, by way of a plurality of speakers, arranged left and right in front of the listener, a center speaker, sub-woofers, and left and right rear surround speakers.

Therefore, an ordinary 2-channel reproduction mode for reproducing 1-bit audio data recorded in the original stereo 2 channels and a multi-channel reproduction mode for reproducing 1-bit audio data recorded in the original plurality of channels are provided in the optical disc player 1. Additionally, a down-mix 2-channel reproduction mode for down-mixing 1-bit audio data recorded in a plurality of channels on the multi-CH area 2-2 to 1-bit audio data for 2 channels is also provided in the optical disc player 1 shown in FIG. 6. This is a mode to be selected when the listener does not have amplifiers and a speaker system for a plurality of channels or when the listener wants to listen to music from the multi-channel source by means of a headphone set. The 2-channel reproduction mode, the multi-channel reproduction mode or the down-mix 2-channel reproduction mode is selected as the listener operates the corresponding switch arranged on the operation panel located at the front side of the cabinet of the optical disc player 1 or on the operating section of the remote controller of the optical disc player 1.

For example, the listener may want to listen to a piece of music in the down-mix 2-channel reproduction mode after having listened to a piece of music in the ordinary 2-channel reproduction mode. As the listener turns the operation switch to select the down-mix 2-channel reproduction mode, a mute state arises and then the latter piece of music is reproduced in the down-mix 2-channel reproduction mode.

The 1-bit signal switching processor 10 of the optical disc player 1 of FIG. 6, which is an embodiment of the present invention, is adapted to switch signals in a mute state where no noise arises when the listener switches from the ordinary 2-channel reproduction mode to the down-mix 2-channel reproduction mode.

Firstly, the configuration of the optical disc player 1 will be described by referring to FIG. 6. An optical pickup 3 includes a laser beam source, a beam splitter, an objective lens, a light receiving element (photodiode) and so on. The optical pickup 3 is adapted to irradiating a laser beam onto optical disc 2, receiving the laser beam reflected by the optical disc 2, converting the reflected and received laser beam into an electric signal and supplying it to an RF circuit 4. The laser beam reflected by the optical disc 2 changes according to the data stored on the optical disc 2.

The RF circuit 4 is adapted to shaping a reproduced RF signal according to the signal from the optical pickup 3, conducting a waveform equalizing process and a binarizing process to provide reproduced data and supplying the reproduced data to front end circuit 5 (FE circuit). The RF circuit 4 is also adapted to generating servo error signals such as a tracking error signal and a focusing error signal.

Thus, it is possible to accurately scan the tracks on the optical disc storing data by means of a laser beam that forms a spot of light having a right size as a result of tracking error control and focusing error control that involve the use of the servo error signals.

Note that a spindle motor for driving the optical disc 2 to rotate, the sled mechanism for moving the optical pickup in a radial direction of the disc and a biaxial actuator for finely adjusting the position of the optical pickup 3 in a direction perpendicular to the disc and a radial direction of the disc are omitted from FIG. 6 for the purpose of simplification of description.

The FE circuit 5 demodulates and corrects errors in the reproduced data supplied to it, and supplies the processed reproduced data to a decoder 6. The decoder 6 decodes the reproduced data into a 1-bit audio data with a frequency of 64 fs and supplies the 1-bit audio data to 1-bit signal switching processor 10.

If the listener chooses the ordinary 2-CH reproduction mode, the optical disc player 1 decodes the 2-CH reproduced data taken out from the 2-CH area 2-1 by way of the optical pickup 3, the RF circuit 4 and the FE circuit 5 by means of the decoder 6 and supplies the decoded data to the 1-bit signal switching processor 10 as 2-CH reproduced signal 300. The 1-bit signal switching processor 10 allows the supplied 2-CH reproduced signal 300 to pass through under the control of system controller 8 so as to supply it from an output terminal 9 to a 2-CH D/A filter (not shown) as switched output signal 305. The D/A filter converts the 2-CH reproduced signal 300 of the 1-bit audio data into an analog audio signal and supplies it to a stereo amplifier. The 2-CH analog audio signal amplified by the stereo amplifier is delivered from the left and right speakers arranged in front of the listener.

If, on the other hand, listener chooses the multi-channel reproduction mode, the optical disc player 1 decodes the multi-CH reproduced data taken out from the multi-CH area 2-2 by way of the optical pickup 3, the RF circuit 4 and the FE circuit 5 by means of the decoder 6 and supplies the decoded data to the 1-bit signal switching processor 10 as multi-channel reproduced signal 301. The 1-bit signal switching processor 10 allows the supplied multi-CH reproduced signal 301 to pass through under the control of system controller 8 so as to supply it from the output terminal 9 to a multi-CH D/A filter (not shown) as switched output signal 305. The D/A filter converts the multi-CH reproduced signal 301 of the 1-bit audio data into an analog audio signal and supplies it to a multi-channel amplifier. The multi-CH analog audio signal amplified by the multi-channel amplifier is delivered typically from the 5.1 CH speakers arranged around the listener.

If the listener chooses the down-mix 2-channel reproduction mode after the end of the ordinary 2-CH reproduction mode, the system controller 8 of the optical disc player 1 supplies a switching instruction (switching request signal) for switching to the down-mix 2-channel reproduction mode according to the operation key input given by the listener (selection of the down-mix 2-channel reproduction mode). The decoder 6 decodes the multi-channel 1-bit audio data taken out from the multi-channel recording area 2-2 by way of the RF circuit 4 and the FE circuit 5 in synchronism with a 64 fs clock and supplies the decoded multi-channel data 301 to a down-mix processing section 7.

The down-mix processing section 7 performs a down-mix processing operation on the multi-channel data 301 decoded by the decoder 6. The down-mix processing section 7 uses not a sampling frequency of 64 fs but a sampling frequency of 128 fs which is twice as high as the sampling frequency of 64 fs for the down-mix processing operation. As a result, the multi-channel signal can be converted into a 2-channel signal whose sound quality is higher than a 2-channel signal obtained by using a sampling frequency of 64 fs for the down-mix processing operation.

The 64 fs clock that the decoder 6 uses and the 128 fs clock that the down-mix processing section 7 uses are generated typically in the system controller 8 by dividing the frequency of a master clock.

The down-mix signal 303 obtained as a result of the down-mix processing operation of the down-mix processing section 7 is supplied to the 1-bit signal switching processor 10. The ordinary 2-channel 1-bit reproduced signal 300 is also supplied to the 1-bit signal switching processor 10.

When the listener selects the down-mix 2-channel reproduction mode after the end of listening to a piece of music reproduced in the ordinary 2-channel reproduction mode, the 1-bit signal switching processor 10 outputs the down-mix signal 303 of the down-mix 2-channel as switched output signal 305 with a mute state interposed between the signal 300 and the signal 303 so as not to generate any switching noise. The 1-bit signal switching processor 10 supplies a switching signal 306 to the system controller 8.

Figure 7:
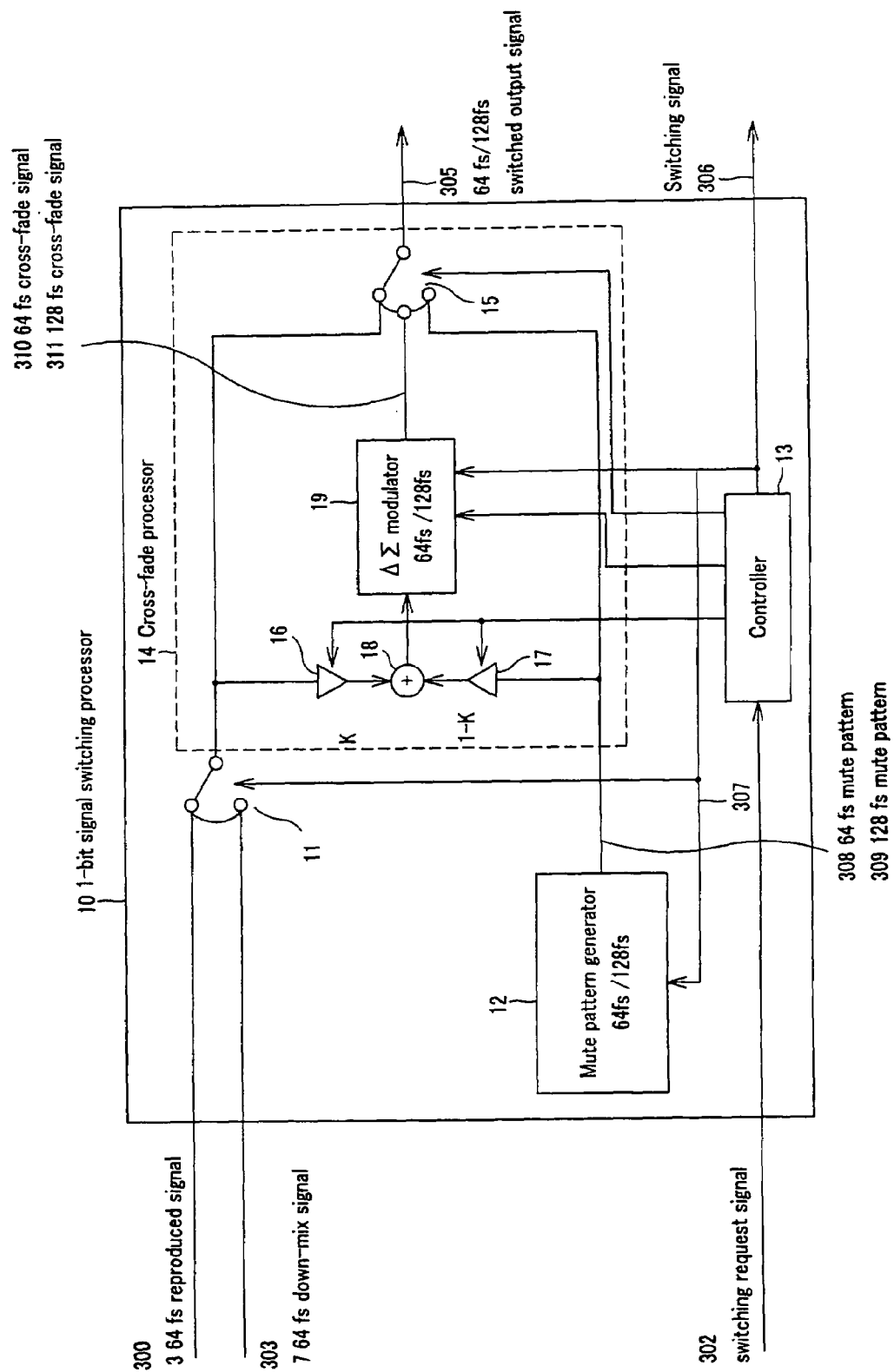
FIG. 7 is a schematic block diagram of the embodiment of 1-bit signal switching processor of FIG. 6, illustrating the configuration thereof.
Figure 8:
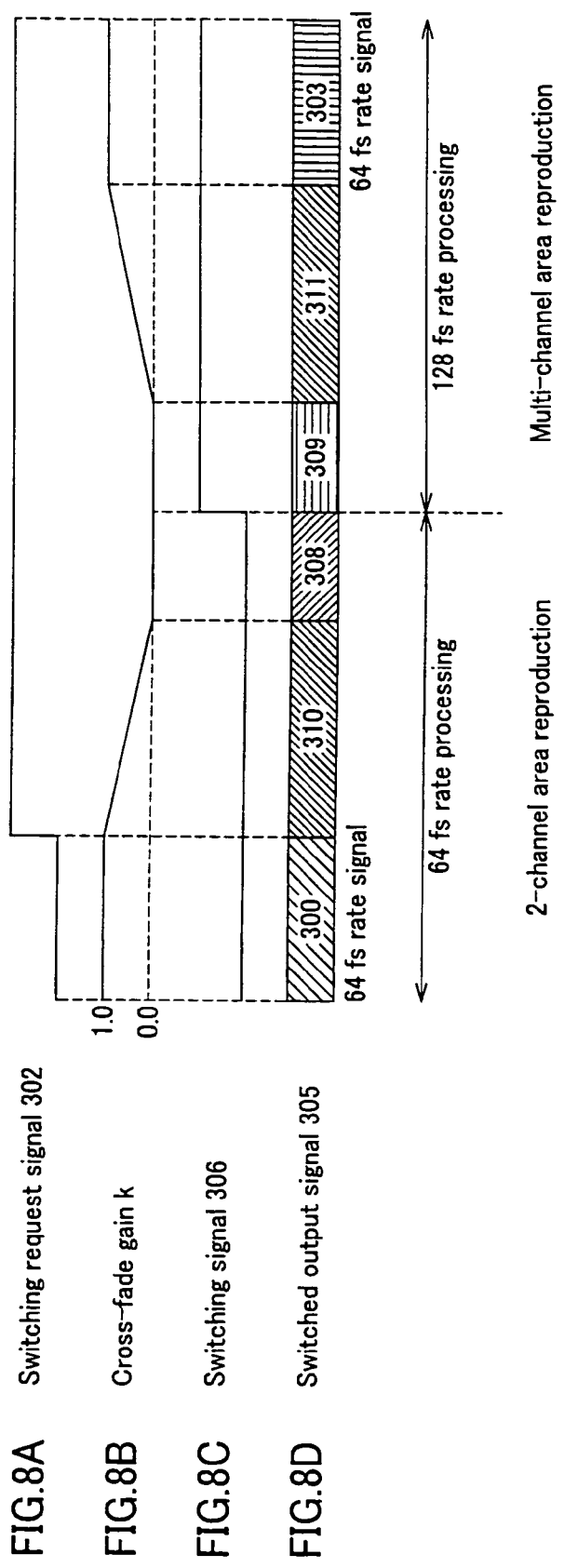
FIG. 8 is a timing chart, illustrating the operation of the embodiment of 1-bit signal switching processor of FIG. 7.

FIG. 7 is a schematic block diagram of the embodiment of 1-bit signal switching processor (64 fs/128 fs 1-bit signal switching processor) 10, illustrating the configuration thereof. FIG. 8 is a timing chart, illustrating the operation of the embodiment of 1-bit signal switching processor 10.

The 1-bit signal switching processor 10 is a digital signal processor adapted to mutually converting high speed sampling 1-bit digital audio signals of two different systems showing a sampling frequency relationship of one equal to integer times of the other such as 64 fs and 128 fs. A high speed sampling 1-bit digital audio data is a 1-bit audio signal of the above described DSD system, or data weighted by "1" vs "−1".

As shown in FIG. 7, the 1-bit signal switching processor 10 comprises a changeover switch 11 for switching from a reproduced signal 300 with a sampling frequency of 64 fs to a down-mix signal 303 with a sampling frequency of 128 fs and vice versa, a mute pattern generator 12 for generating mute patterns of two different systems in a switched manner, one with a sampling frequency of 64 fs and the other with a sampling frequency of 128 fs, and a controller 13 for supplying a switching control signal 307 to the mute pattern generator 12 according to the switching request signal 302 from the system controller 8 of the optical disc player 1. The 1-bit signal switching processor 10 additionally comprises a cross-fade processor 14 for cross-fading from a reproduced signal 300 with a sampling frequency of 64 fs to a mute pattern signal 308 with a sampling frequency 64 fs at a rate of 64 fs that is equal to the sampling frequencies and cross-fading from a mute pattern signal 309 with a sampling frequency of 128 fs to a down-mix signal 303 with a sampling frequency of 128 fs at a rate of 128 fs that is equal to the sampling frequencies.

The mute pattern generator 12 generates a mute pattern of 64 fs and a mute pattern of 128 fs respectively in synchronism with a 64 fs clock and a 128 fs clock generated by dividing the frequency of a master clock by the controller 13 by means of a counter. More specifically, it generates a mute pattern of 64 fs and a mute pattern of 128 fs respectively by dividing the frequency of a single master clock to produce 64 fs and 128 fs on the basis of their relationship of one equal to integer times of the other. In other words, the pulse forms of the mute patterns are linked to each other at the rising edge and the falling edge without any phase shift. Additionally, the mute pattern generator 12 can link the mute pattern 308 of 64 fs to the mute pattern 309 of 128 fs without generating any noise, if the two mute patterns satisfy a specific requirement that the time average values of the double integrals of minimum repetitive patterns of the two mute patterns are equal to each other. This will be described in greater detail hereinafter.

The cross-fade processor 14 is adapted to perform cross-fade processing operations, using the technique disclosed in the above cited Patent Document 1, or Japanese Patent No. 3318823. More specifically, the cross-fade processor 14 comprises a first coefficient multiplier 16 for multiplying a reproduced signal 300 with a sampling frequency of 64 fs or a down-mix signal 303 with a sampling frequency of 128 fs by the multiplication coefficient (cross-fade gain) k supplied from the controller 13 and varying the amplitude level to produce a multi-bit data, a second coefficient multiplier 17 for multiplying a mute pattern signal 308 with a sampling frequency of 64 fs or a mute pattern signal 309 with a sampling frequency of 128 fs generated by the mute pattern generator 12 by the coefficient (1−k) obtained by subtracting the multiplication coefficient (cross-fade gain) k supplied from the controller 13 from 1 and varying the amplitude level to produce a multi-bit data and an adder 18 for adding the multiplication output of the first coefficient multiplier 16 and the multiplication output of the second coefficient multiplier 17.

The cross-fade processor 14 further comprises a $\Delta\Sigma$ modulator 19 for conducting a re-$\Delta\Sigma$ modulation process on the addition output from the adder 18 and outputting a 1-bit audio data (cross-fade signal 310/311) with a sampling frequency of 64 fs or 128 f and a changeover switch 15 for switching a reproduced signal 300 with a sampling frequency of 64 fs or a down-mix signal 303 with a sampling frequency of 128 fs, the output data (cross-fade signal 310 with a sampling frequency of 64 fs/cross-fade signal 311 with a sampling frequency of 128 fs) from the $\Delta\Sigma$ modulator 19 and the mute pattern signal 308 with a sampling frequency of 64 fs or the mute pattern signal 309 with a sampling frequency of 128 fs from the mute pattern generator 12 under the control of the controller 13.

Figure 1:
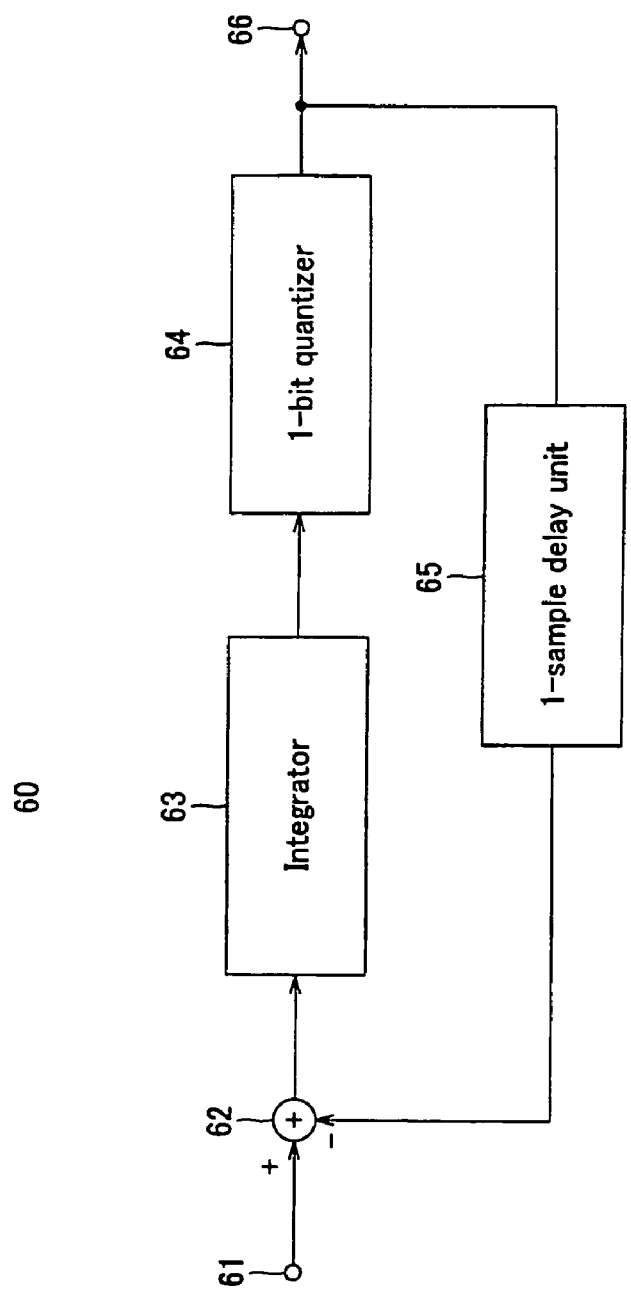
FIG. 1 is a schematic block diagram of a ΔΣ modulator, illustrating the configuration thereof.
Figure 2:
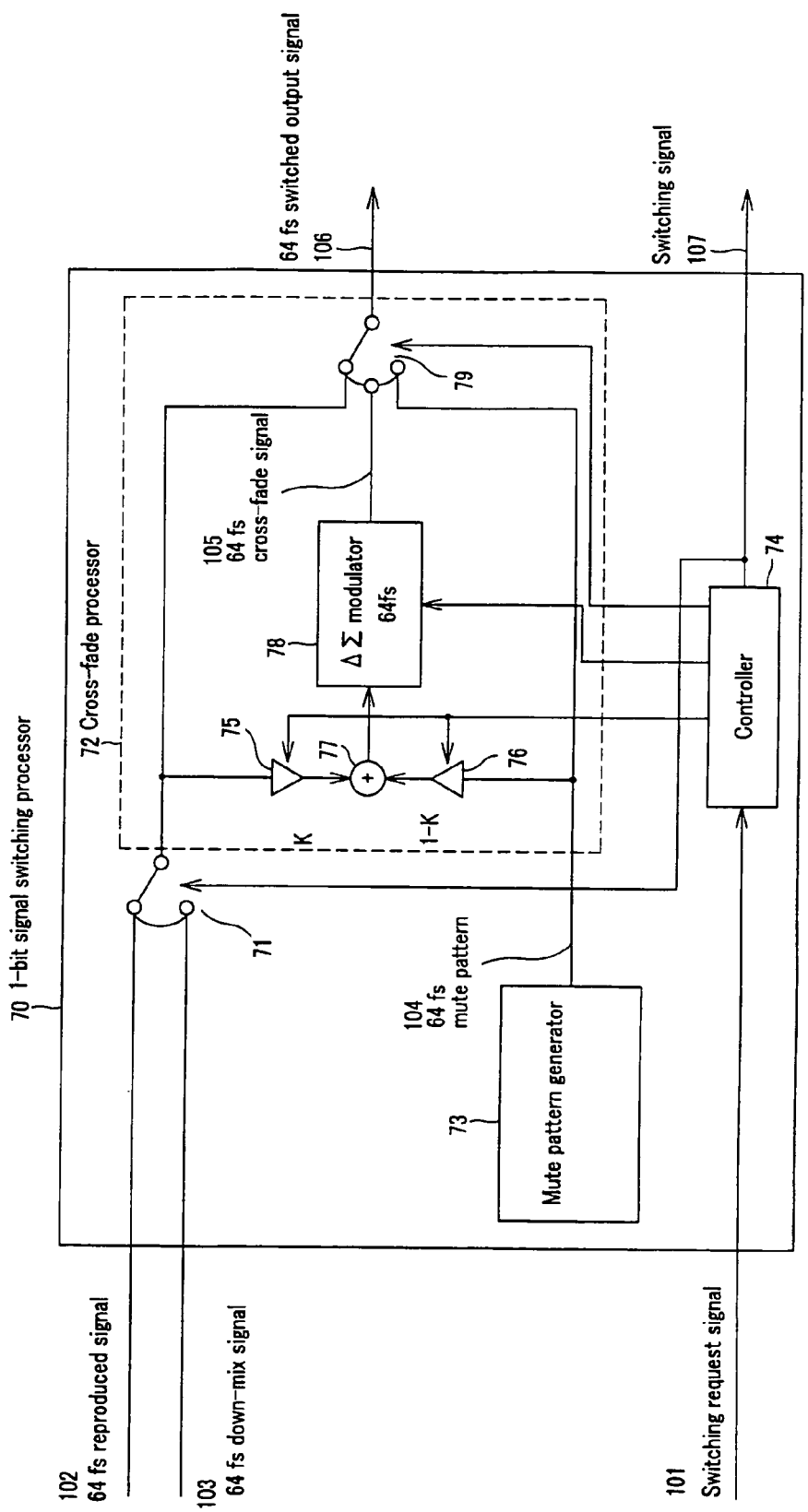
FIG. 2 is a schematic block diagram of a known 1-bit signal switching processor, illustrating the configuration thereof.
Figure 3:
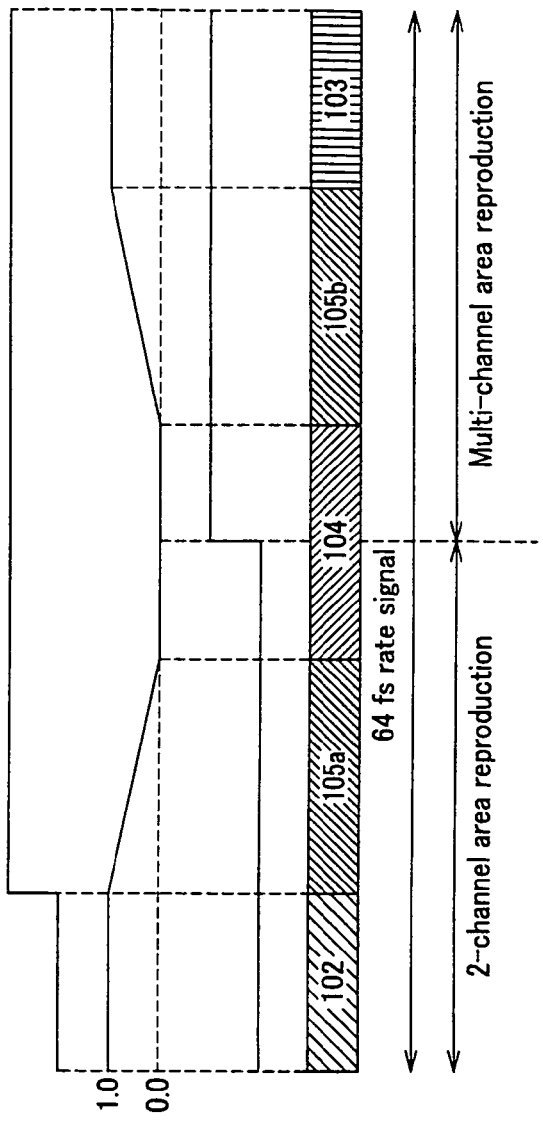
FIG. 3 is a timing chart, illustrating the operation of the known 1-bit signal switching processor of FIG. 2.
Figure 4:
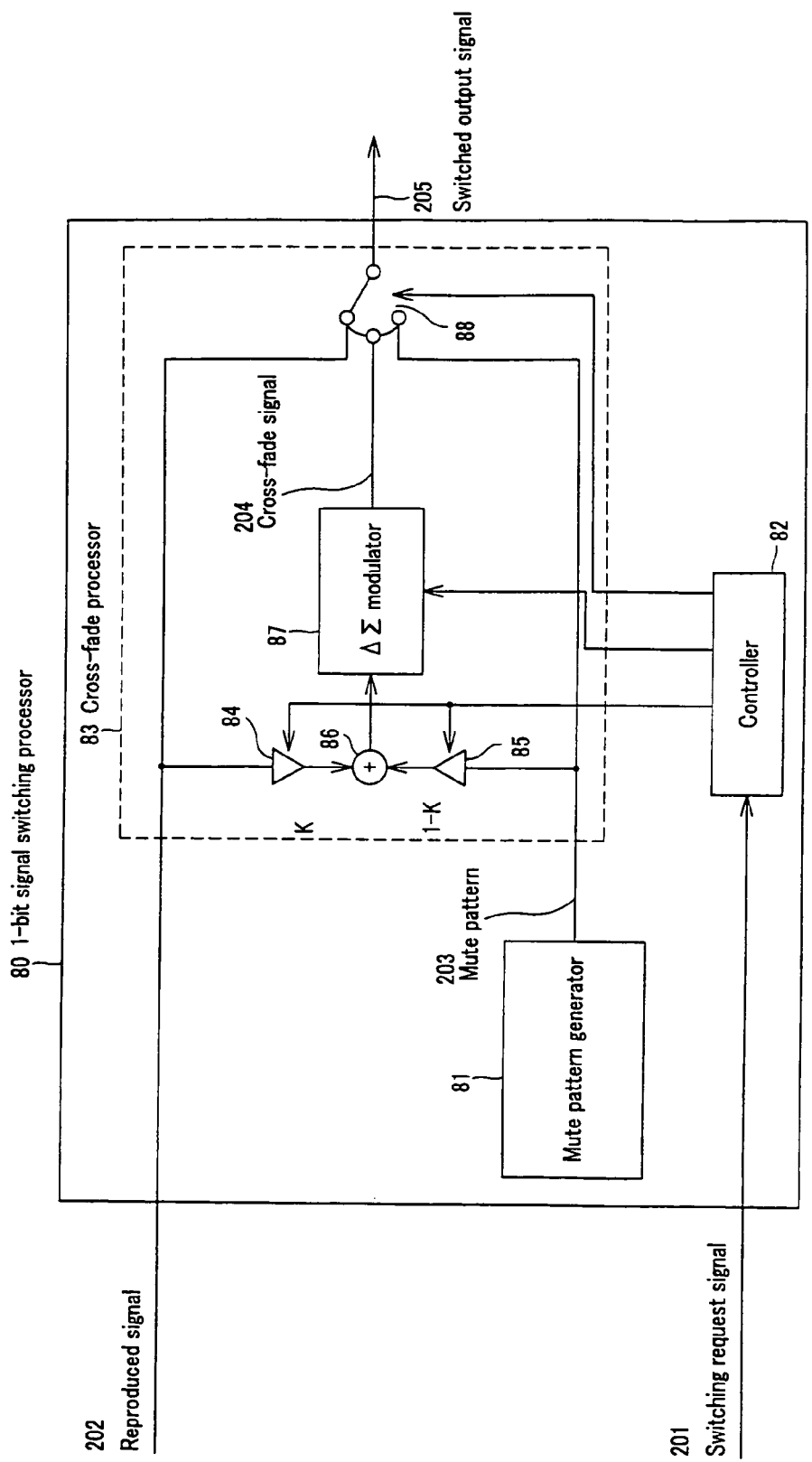
FIG. 4 is a schematic block diagram of another known 1-bit signal switching processor, illustrating the configuration thereof.
Figure 5:
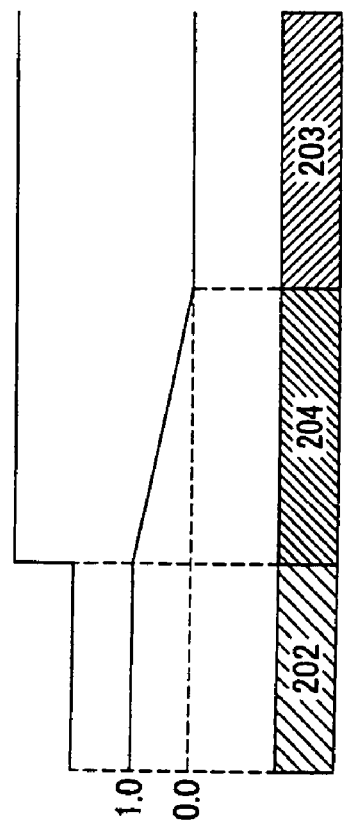
FIG. 5 is a timing chart, illustrating the operation of the known 1-bit signal switching processor of FIG. 4.

Now, the operation of the 1-bit signal switching processor 10 will be described below by referring to FIG. 3. This is an operation that takes place when the listener selects the down-mix 2-channel reproduction mode by means of the operation switch on the front operation panel of the optical disc player 1 because he or she has finished listening to a piece of music in the ordinary 2-channel reproduction mode of 64 fs and wants to listen to another piece of music in the down-mix 2-channel reproduction mode of 128 fs.

Firstly, upon receiving a switching request signal 302 from the system controller 8, the controller 13 of the 1-bit signal switching processor 10 has the cross-fade processor 14 cross-fade the 64 fs reproduced signal 300 already selected by means of the changeover switch 11 into a 64 fs mute pattern 308 generated by the mute pattern generator 12 to satisfy the above described specific requirement.

More specifically, the transitional multiplication coefficient (cross-fade gain) k that transits from 1 to 0 is given to the first coefficient multiplier 16 and the second coefficient multiplier 17. Then, the first coefficient multiplier 16 supplies the multiplication output (fade-out output) obtained by multiplying the 64 fs reproduced signal 300 by the transitional multiplication coefficient k that transits from 1 to 0 to the adder 18. At the same time, the second coefficient multiplier 17 supplies the multiplication output (fade-in output) obtained by multiplying the 64 fs mute pattern signal 308 by the transitional multiplication coefficient (1−k) that transits from 0 to 1 to the adder 18. The adder 18 supplies the addition output (cross-fade output) obtained by adding the multiplication output (fade-out output) of the first coefficient multiplier 16 and the multiplication output (fade-in output) of the second coefficient multiplier 17 to the $\Delta\Sigma$ modulator 19. The $\Delta\Sigma$ modulator 19 conducts a re-$\Delta\Sigma$ modulation process on the addition output (cross-fade output), using the 64 fs clock supplied from the controller 13 and supplies a 64 fs 1-bit digital cross-fade signal 310 to the changeover switch 15. The changeover switch 15 is also supplied with the 64 fs reproduced signal 310 and the 64 fs mute pattern signal 308.

Upon receiving the switching request signal from the system controller 8, the controller 13 outputs the switched output signal 305 obtained by smoothly switching from the 64 fs rate reproduced signal 300 to the 64 fs cross-fade signal 310 and then to the 64 fs mute pattern signal 308, appropriately using the changeover switch 15, as shown in FIG. 8.

As the 64 fs mute pattern signal 308 is output as the switched output signal 305, the controller 13 generates a switching signal 306 at an appropriately controlled timing and has the mute pattern generator 12 switch from the 64 fs mute pattern signal 308 to the 128 fs mute pattern signal 309 as the two mute patterns satisfy a specific requirement. The specific requirement will be described in greater detail hereinafter. At the same time, the controller 13 controls the switching operation of the changeover switch 11 so as to switch the input signal from the 64 fs reproduced signal 300 to the 128 fs down-mix signal 303. Additionally, the controller 13 switches the processing rate in the cross-fade processor 14 from 64 fs to 128 fs.

As the optical disc player 1 is switched from the 2-channel reproduction mode to the multi-channel reproduction mode, the 1-bit signal switching processor 10 then carries out a cross-fade processing operation on the 128 fs down-mix signal 303 and the 128 fs mute pattern signal 309 by means of the cross-fade processor 14. The multiplication coefficient (cross-fade gain) k that transits from 0 to 1 is given to the first coefficient multiplier 16 and the second coefficient multiplier 17 for the cross-fade process. Then, the first coefficient multiplier 16 supplies the multi-bit multiplication output (fade-in output) obtained by multiplying the 128 fs down-mix signal 303 by the multiplication coefficient k that transits from 0 to 1 to the adder 18. At the same time, the second coefficient multiplier 17 supplies the multi-bit multiplication output (fade-out output) obtained by multiplying the 128 fs mute pattern signal 309 by the multiplication coefficient (1−k) that transmits from 1 to 0 to the adder 18. Then, the adder 18 supplies the addition output (cross-fade output) obtained by adding the multiplication output (fade-in output) of the first coefficient multiplier 16 and the multiplication output (fade-out output) of the second coefficient multiplier 17 to the ΔΣ modulator 19. The ΔΣ modulator 19 conducts a re-ΔΣ modulation process on the addition output (cross-fade output), using the 128 fs clock supplied from the controller 13 and supplies a 128 fs 1-bit digital cross-fade signal 311 to the changeover switch 15. The changeover switch 15 is also supplied with the 128 fs digital cross-fade signal 311 and the 128 fs mute pattern signal 309 as well as the 128 fs down-mix signal 303.

The controller 13 outputs the switched output signal 305 obtained by smoothly switching from the 128 fs mute pattern signal 309 to the 128 fs cross-fade signal 311 and then to the 128 fs down-mix signal 303, appropriately controlling the switching operation of the changeover switch 13, as shown in FIG. 8.

The 1-bit signal switching processor 10 is a device for switching from a 64 fs signal to a 128 fs signal and vice versa. The processing operations of the 1-bit signal switching processor 10 are conducted with 64 fs before the mute pattern is switched from 64 fs to 128 fs and with 128 fs after the switch.

Figure 9:
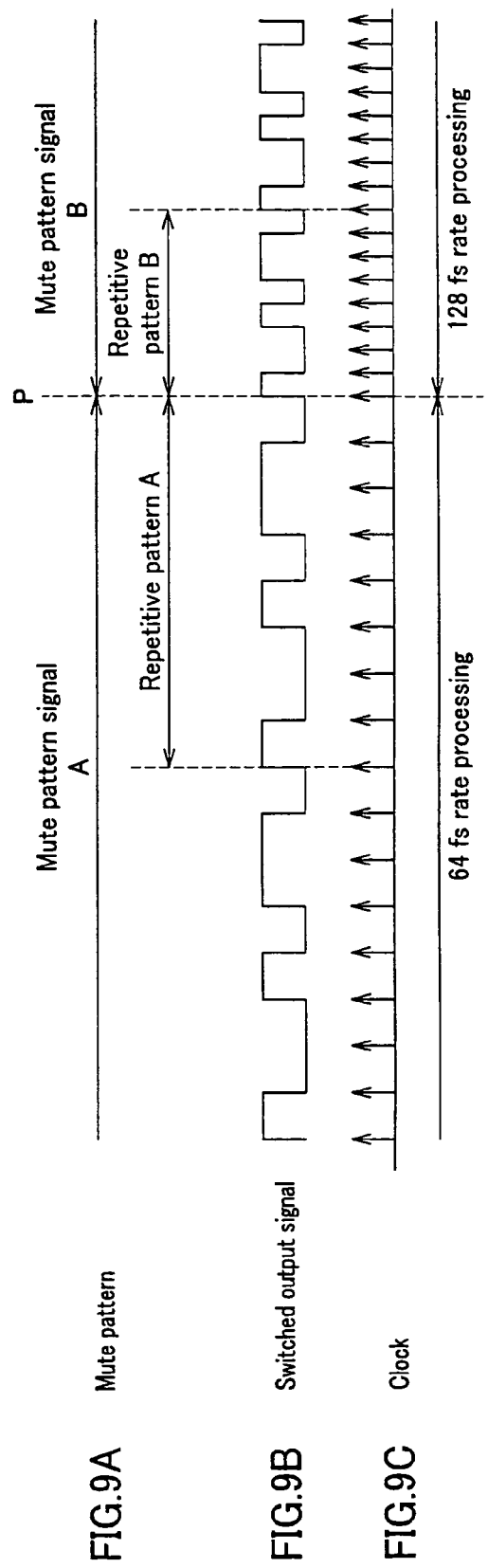
FIG. 9 is a schematic illustration of a processing operation of linking a mute pattern signal with a rate of 64 fs and a mute pattern signal with a rate of 128 fs to be performed by a mute pattern generator.

FIG. 9 is a schematic illustration of a processing operation of linking a 64 fs rate mute pattern signal 308 and a 128 fs rate mute pattern signal 309 that is performed by the mute pattern generator 12. Mute pattern signal A and mute pattern signal B that are formed by repeating a fixed pattern at the respective rates are directly switched at point P. Noise components can be generated in the audio frequency band when different mute patterns are linked directly by means of existing technique. However, according to the invention, a fixed pattern that makes the time average values of double integral signals of minimum repetitive patterns of the mute patterns agree with each other for a pattern cycle period is used in opposite directions from the link point P.

Figure 10:
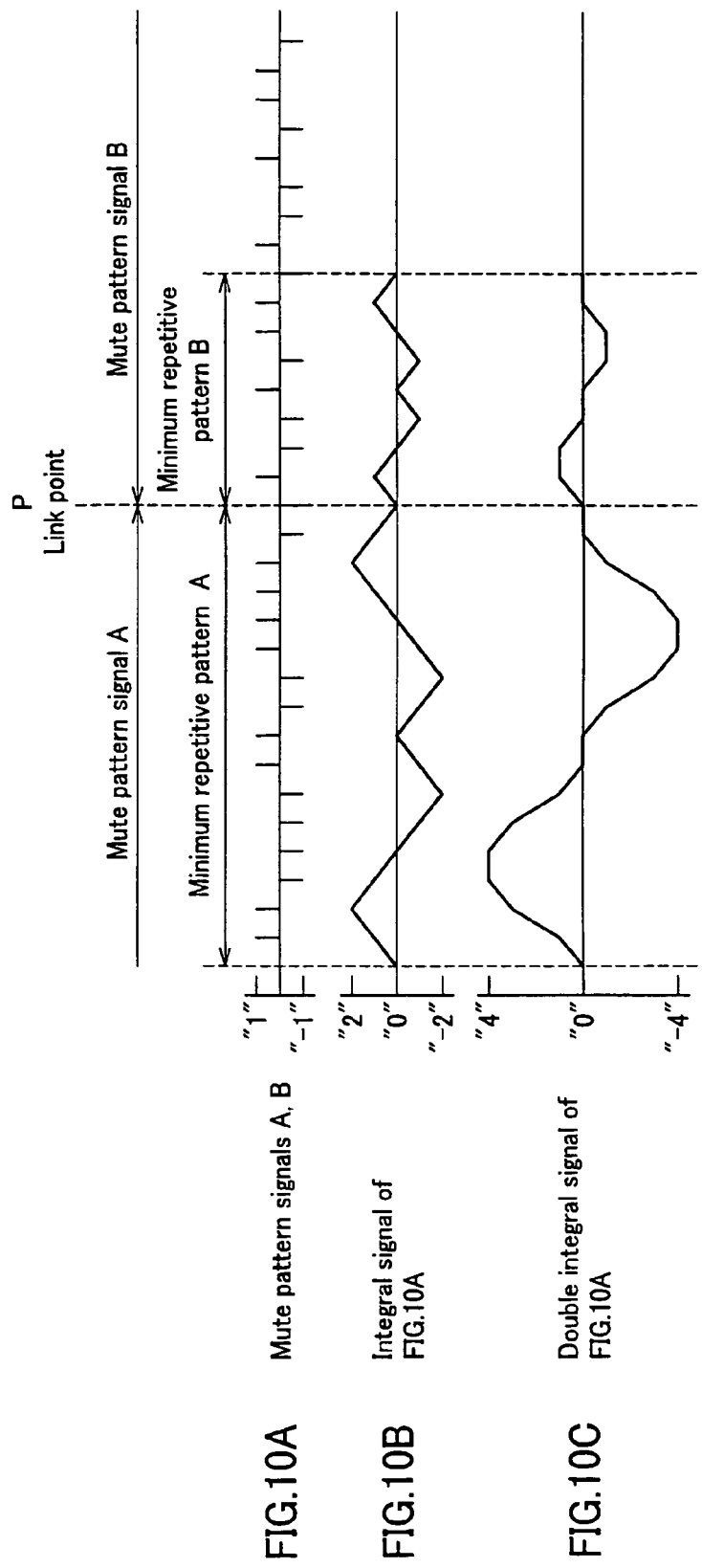
FIGS. 10A through 10C are graphs schematically illustrating the integrated waveform of a mute pattern.

FIGS. 10A through 10C illustrate the integrated waveforms of the mute patterns shown in FIG. 9 that are obtained when "1, 1, −1, −1, −1, −1, 1, 1, −1, −1, 1, 1, 1, 1, −1, −1" is used as the 64 fs rate minimum repetitive pattern A and "1, −1, −1, 1, −1, 1, 1, −1" is used as the 128 fs rate minimum repetitive pattern B. A 64 fs rate signal is expressed by means of a 128 fs rate signal in which data of a same level continues by m=2 samples. In other words, 1/m (=½) 64 fs corresponds to 128 fs.

FIG. 10A shows the mute pattern signals and FIG. 10B shows the integral signals of the mute pattern signals, while FIG. 10C shows the double integral signals of the mute pattern signals. The pattern cycle period of the minimum repetitive pattern A is 16 and that of the minimum repetitive pattern B is 8 for 182 fs and the time average values of the double integral signals of the two patterns are equal to 0. Thus, the time average values of the double integral signals agree with each other when the two mute patterns are linked at the link point P so as to extend in the opposite directions. Then, no noise is generated in the audio frequency band when the mute patterns are directly linked to each other.

Figure 11:
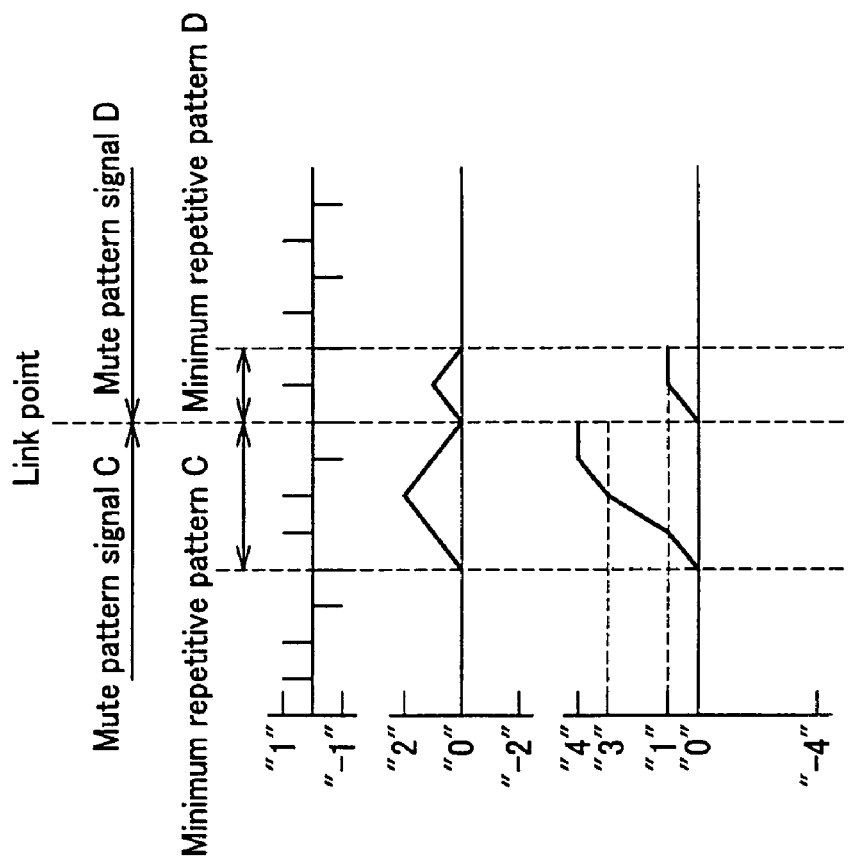
FIGS. 11A through 11C are graphs schematically illustrating the integrated waveform of another mute pattern.

FIGS. 11A through 11C illustrate the integrated waveforms of the mute patterns obtained by using "1, 1, −1, −1" as the 64 fs minimum repetitive pattern C and "1, −1" as the 128 fs minimum repetitive pattern D. FIG. 11A shows the mute pattern signals and FIG. 11B shows the integral signals of the mute pattern signals, while FIG. 11C shows the double integral signals of the mute pattern signals. In the case of these mute patterns, the time average values of the double integrals of the two mute patterns are "3" and "1" as shown in FIG. 11C, which obviously do not agree with each other, although the number of "1(s)" is same as that of "−1(s)".

Noises can be generated when such mute patterns are linked directly and hence the mute patterns cannot be suitably linked to each other.

As described above, the 1-bit signal switching processor 10 of the optical disc player 1 can switch high speed sampling 1-bit digital audio signals of two systems that are weighted by "1" vs "−1" such as a 64 fs 2-CH reproduced signal and a 128 fs down-mix 2-CH signal whose sampling frequencies differ from each other but shows a sampling frequency relationship of one equal to integer times of the other, or twice, suppressing noises in the audio frequency band. In other words, it is possible to switch from a signal having a sampling frequency to another signal having a sampling frequency different from the sampling frequency of the former signal with suppressed noises in the audio frequency band by means of a digital signal processing apparatus and a digital signal processing method according to the invention.

While a 64 fs 2-CH 1-bit audio data is linked to a 128 fs 2-CH 1-bit audio data in the above described embodiment, the present invention is also applicable to a case where a 128 fs 2-CH 1-bit audio data is linked to a 64 fs 2-CH 1-bit audio data. To realize such a link, a 128 fs cross-fade signal is linked to a 128 fs 2-CH reproduced signal and a 128 fs mute pattern signal is linked to the 128 fs cross-fade signal. Then, a 64 fs mute pattern signal is linked to the 128 fs mute pattern signal at a link point that makes the time average values of the double integrals of the two signals equal to each other. Thereafter, a 64 fs cross-fade signal is linked to the 64 fs mute pattern signal and then a 64 fs 2-CH reproduced signal is linked to the 64 fs cross-fade signal.

Additionally, while the above embodiment is described in terms of a switching operation of 64 fs and 128 fs as an example of a combination of sampling frequencies, the present invention is applicable to any sampling frequencies showing a relationship of one equal to integer times of the other. For example, combinations of 64 fs and 192 fs and 64 fs and 256 fs showing respectively relationships of 3 times and four times may be used with the above described embodiment.

While mute patterns are switched one to the other only once in the above described embodiment, mute pattern signals that satisfy the above described requirement may be linked for a number of times. For example, 1-bit audio signals with respective sampling frequencies of 64 fs, 128 fs and 256 fs may be linked directly by means of mute pattern signals with respective sampling frequencies of 64 fs, 128 fs and 256 fs having link points that make the time average values of the double integrals of the mute pattern signals equal to each other.

While mute pattern signals whose double integral signals have the same time average value are used for the above described embodiment, mute pattern signals whose triple integral signals have the same time average value may more preferably be used for the purpose of the present invention. While the above described embodiment is a super audio CD player, the present invention is by no means limited to a super audio CD player and is applicable to systems of other types adapted to handle 1-bit signals.

Figure 12:
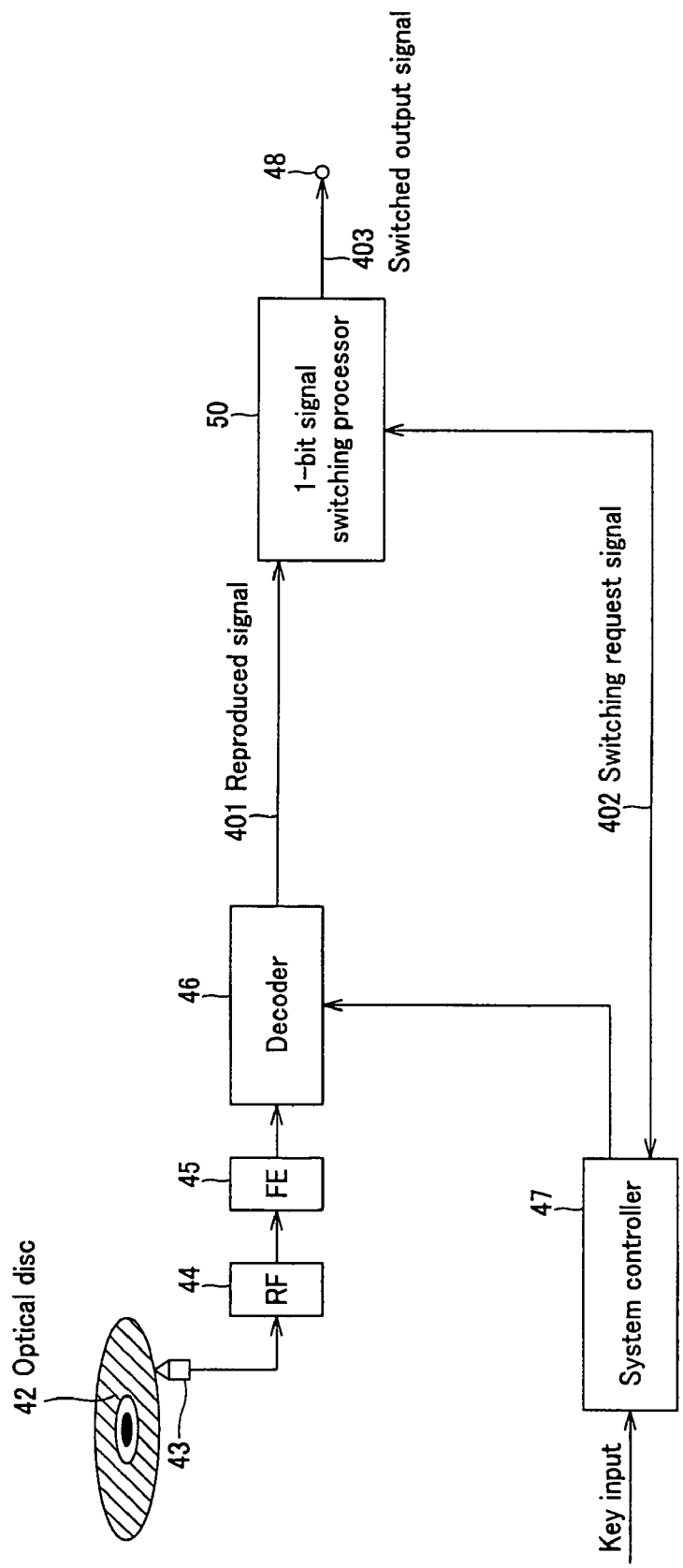
FIG. 12 is a schematic block diagram of an optical disc player containing another embodiment of 1-bit signal switching processor according to the invention, illustrating the system configuration thereof.

Now, another preferred embodiment of the invention will be described by referring to the related drawings. FIG. 12 is a schematic block diagram of an optical disc player 41 containing an embodiment of 1-bit signal switching processor 50 according to the invention, which shows the configuration of the processor and illustrates a digital signal processing apparatus and a digital signal processing method according to the invention.

The optical disc 42 that the optical disc player 41 can play is also a super audio CD storing digital audio signals that are weighted by "1" vs "−1", which signals may typically be 1-bit audio data of a DSD system generated by ΔΣ modulation.

The optical disc player 41 decodes the data stored on the optical disc 42 by means of a decoder and outputs 1-bit reproduced signals when the CD is being played and outputs mute patterns when the operation of the optical disc player 41 is stopped. The 1-bit signal switching processor 50 operates for switching from a 1-bit reproduced signal to a mute pattern signal.

The 1-bit signal switching processor 50 is a digital signal processor adapted to process high speed sampling 1-bit digital audio signals of two different systems that are weighted by "1" vs "−1" and have the same sampling frequency.

Firstly, the configuration of the optical disc player 41 will be described by referring to FIG. 12. An optical pickup 43 includes a laser beam source, a beam splitter, an objective lens, a light receiving element (photodiode) and so on. The optical pickup 43 is adapted to irradiating a laser beam onto optical disc 42, receiving the laser beam reflected by the optical disc 42, converting the reflected and received laser beam into an electric signal and supplying it to RF circuit 44. The laser beam reflected by the optical disc 42 changes according to the data stored on the optical disc 42.

The RF circuit 44 is adapted to shaping a reproduced RF signal according to the signal from the optical pickup 43, conducting a waveform equalizing process and a binarizing process to provide reproduced data and supplying the reproduced data to front end circuit 45 (FE circuit). The RF circuit 44 is also adapted to generating servo error signals such as a tracking error signal and a focusing error signal.

Thus, it is possible to accurately scan the tracks on the optical disc storing data by means of a laser beam that forms a spot of light having a right size as a result of tracking error control and focusing error control that involve the use of the servo error signals.

Note that a spindle motor for driving the optical disc 42 to rotate, the sled mechanism for moving the optical pickup 43 in a radial direction of the disc and a biaxial actuator for finely adjusting the position of the optical pickup 43 in a direction perpendicular to the disc and a radial direction of the disc are omitted from FIG. 12 for the purpose of simplification of description.

The FE circuit 45 demodulates and corrects errors in the reproduced data supplied to it, and supplies the processed reproduced data to a decoder 46. The decoder 46 decodes the reproduced data into a 1-bit audio data with a frequency of 64 fs and supplies the 1-bit audio data to 1-bit signal switching processor 50.

As the listener operates the optical disc player 41 to switch the playing status to the stop status, the system controller 47 supplies a switching request signal to the 1-bit signal switching processor 50.

The 1-bit signal switching processor 50 switches from the playing status of supplying reproduced signals to the stop status using the mute pattern signal.

Figure 13:
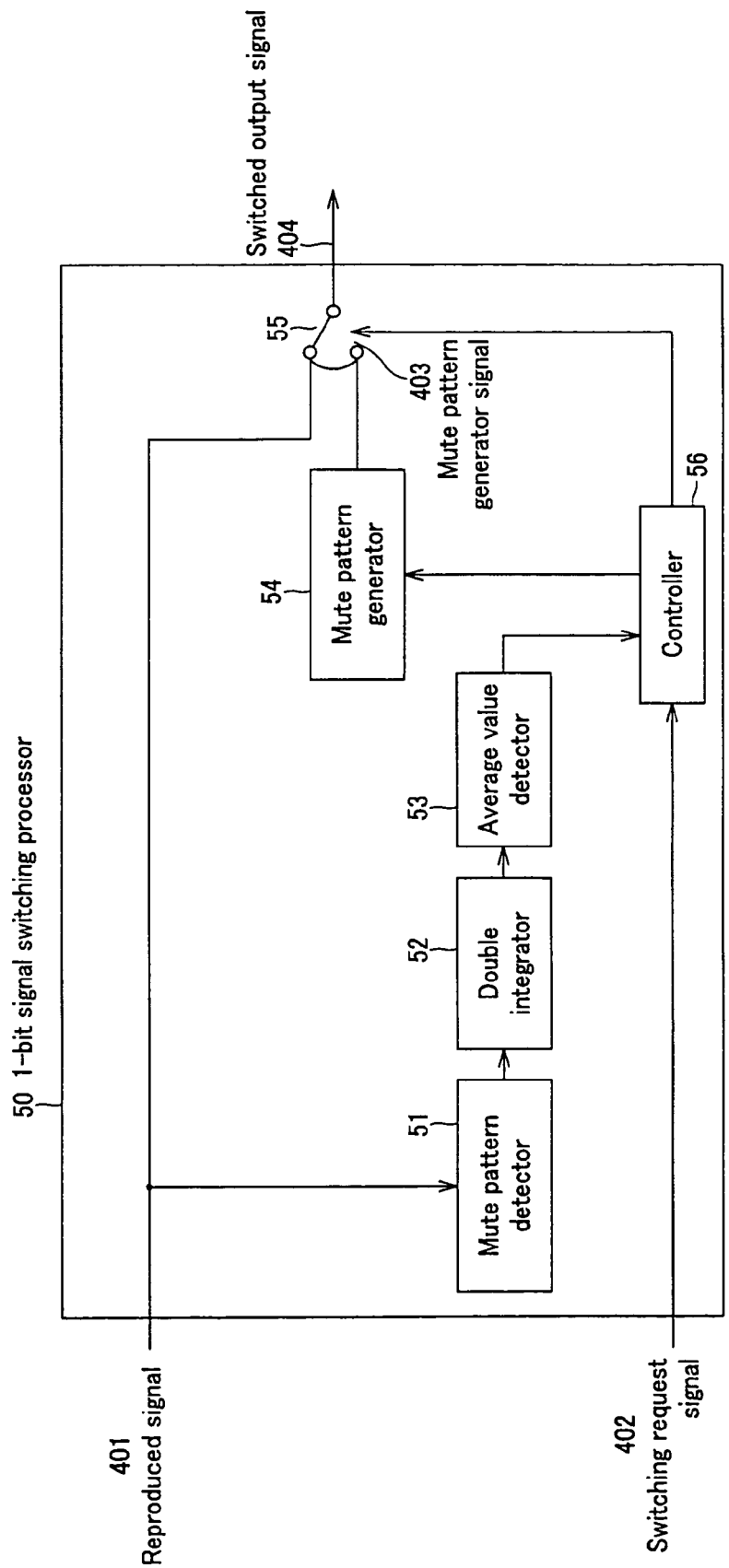
FIG. 13 is a schematic block diagram of the embodiment of 1-bit signal switching processor of FIG. 12, illustrating the configuration thereof.
Figure 14:
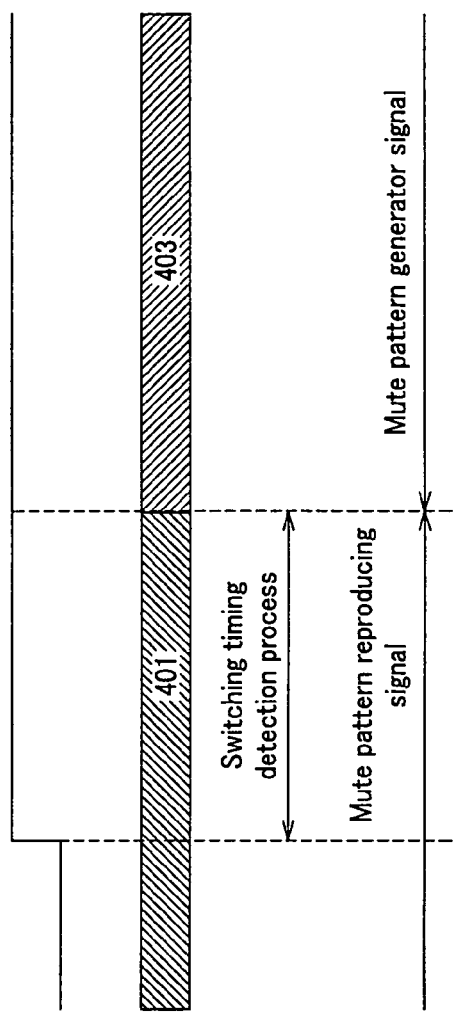
FIG. 14 is a timing chart, illustrating the operation of the embodiment of 1-bit signal switching processor of FIG. 13.

FIG. 13 is a schematic block diagram of the embodiment of 1-bit signal switching processor 50, illustrating the configuration thereof. FIG. 14 is a timing chart, illustrating the operation of the embodiment of 1-bit signal switching processor 50.

The 1-bit signal switching processor 50 is a digital signal processor adapted to processing high speed sampling 1-bit digital audio signals of two systems showing the same sampling frequency of 64 fs, for example. A high speed sampling 1-bit digital audio signal is a 1-bit audio data of the above-described DSD system, or data weighted by "1" vs "−1".

As shown in FIG. 13, the 1-bit signal switching processor 50 comprises a mute pattern detector 51 for detecting a first mute pattern signal from the input 64 fs 1-bit audio reproduced signal 401, a double integrator 52 for performing an operation of double integration on the data of a cycle period of the first mute pattern signal detected by the mute pattern detector 51, an average value detector 53 for detecting the average value of the double integrals obtained by the double integrator 52 a mute pattern generator 54 for generating a second mute pattern different from the first mute pattern but having a sampling frequency of 64 fs same as that of the first mute pattern and producing the average value of the double integrals of the data of a cycle period that becomes equal to a predetermined value, a changeover switch 55 for switching from the input 1-bit audio reproduced signal 401 and the second mute pattern generated by the mute pattern generator 54 and vice versa and a controller 56 for detecting the timing when the average value of the double integrals of the first mute pattern obtained by the average value detector 53 becomes equal to the predetermined value and, upon detecting the timing, controlling the switching operation of the changeover switch 55 at the detected timing and switching from the 1-bit audio reproduced signal 401 to the second mute pattern signal.

Now, the operation of the 1-bit signal switching processor 50 will be described below by referring to FIG. 14. The 1-bit signal switching processor 50 detects a mute pattern that is a repetition of the same pattern from the reproduced signal 401 by means of the mute pattern detector 51, performs an operation of double integration on the data of one cycle period by means of the double integrator 52 and leads out the time average value of the double integrals of a cycle period by means of the average value detector 53. Upon receiving a switching request signal 402 from the system controller 47 of the optical disc player 41, the controller 56 detects the timing when the time average value of the double integrals of the reproduced mute pattern from the detector 53 becomes equal to 0, for instance, and directly switches from the reproduced signal 401 to the mute pattern signal 403 from the mute pattern generator 54 at the detected timing by means of the changeover switch 55. At the same time, it has the mute pattern generator 54 generate a pattern whose time average value of the double integrals thereof is also equal to 0 for a cycle period. As a result, it is possible to smoothly switch from the reproduced mute pattern signal to the mute pattern signal of the mute pattern generator 54.

Figure 15:
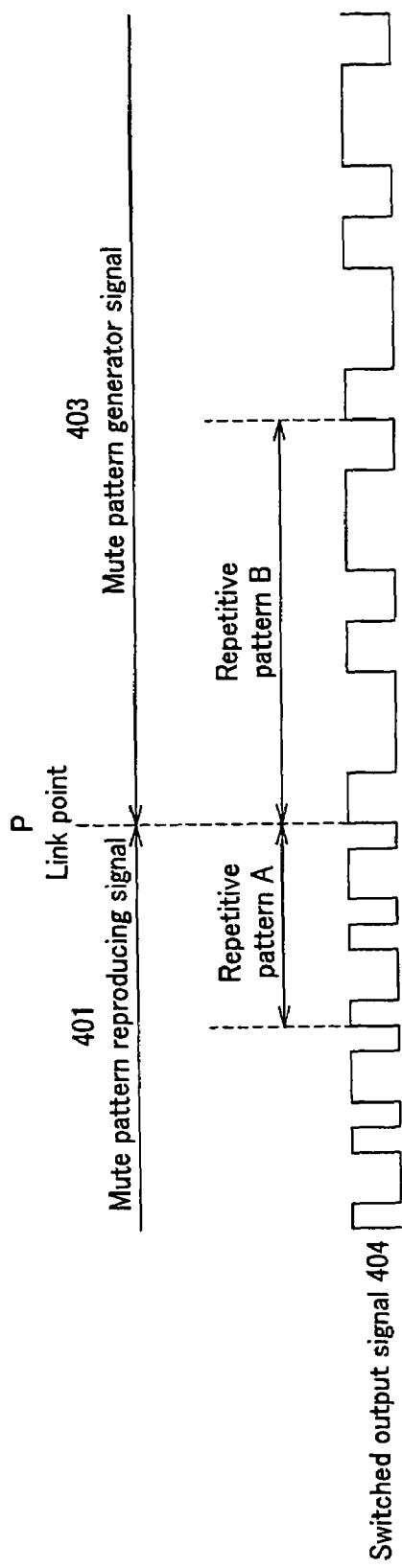
FIG. 15 is a graph illustrating an example of mute pattern switching.

FIG. 15 illustrates how mute patterns of two different types including a mute pattern reproduced signal 401 and a mute pattern signal 403 generated by the mute pattern generator 54 are linked together. The two mute pattern signals that are formed by repeating a fixed pattern are directly switched from one to the other at point P. A fixed pattern that makes the time average values of double integral signals of minimum repetitive patterns A, B of the mute patterns agree with each other for a pattern cycle period is used in opposite directions from the link point P in order to suppress noise components in the audio frequency range when the two different mute patterns are directly linked.

FIGS. 16A through 16C illustrate the integrated waveforms of the mute pattern signals shown in FIG. 15 that are obtained when "1, −1, −1, 1, −1, 1, 1, −1" is used as the minimum repetitive pattern A and "1, 1, −1, −1, −1, −1, 1, 1, −1, −1, 1, 1, 1, 1, −1, −1" is used as the minimum repetitive pattern B. FIG. 16A shows the mute pattern signals and FIG. 16B shows the integral signals of the mute pattern signals, while FIG. 16C shows the double integral signals of the mute pattern signals. The pattern cycle period of the minimum repetitive pattern A is 8 and that of the minimum repetitive pattern B is 16 and the time average values of the double integral signals of the two mute patterns are equal to 0. Thus, the time average values of the double integral signals agree with each other when the two patterns are linked at the link point P so as to extend in the opposite directions. Therefore, it is possible to directly link the mute patterns to each other.

On the other hand, FIGS. 17A through 17C illustrate the integrated waveforms of the mute patterns obtained by using "1, −1" as the minimum repetitive pattern C and "1, 1, −1, −1" as the minimum repetitive pattern D. FIG. 17A shows the mute pattern signals and FIG. 17B shows the integral signals of the mute pattern signals, while FIG. 17C shows the double integral signals of the mute pattern signals. In the case of these mute patterns, the time average values of the double integrals of the two mute patterns are "1" and "3" as shown in FIG. 17C, which obviously do not agree with each other, although the number of "1(s)" is same as that of "−1(s)". Noises can be generated when such mute patterns are linked directly and hence the mute patterns cannot be suitably linked to each other.

FIGS. 18A through 18I are graphs illustrating the time average value of double integrals of a mute pattern reproduced signal of "1, −1, −1, 1, −1, 1, 1, −1". They show that the values of double integrals differ from each other and hence are transitional depending on the selection of the starting point of a cycle period, although the same mute pattern is used. FIG. 18C shows a double integral signal of cycle period T0 from time t0, the time average value thereof being 5.5. FIG. 18E shows a double integral signal of cycle period T1 from time t1, the time average value thereof being 1. FIG. 18G shows a double integral signal of cycle period T2 from time t2, the time average value thereof being −5.5. FIG. 18I shows a double integral signal of cycle period T3 from time t3, the time average value thereof being 0. Thus, it is possible to link the mute pattern to another mute pattern whose double integral signal having a time average value of 0 at time t11 when the cycle period T3 ends. FIGS. 18A through 18I illustrate an exemplary mute pattern generator signal 403 whose time average value is equal to 0 when "1, 1, −1, −1, −1, −1, 1, 1, −1, −1, 1, 1, 1, 1, −1, −1" is used. Thus, the mute patterns can be linked to each other at the illustrated timing.

As described above, the 1-bit signal switching processor 50 of the optical disc player 41 can switch different mute patterns from one to the other when the sampling frequency is 64 fs for both of the mute patterns, while sufficiently suppressing the noise components in the audio frequency range.

While two mute patterns whose double integral signals show the same time average value are used in the above-described embodiment, two mute patterns whose triple integral signals show the same time average value may be used more preferably.

While the above-described embodiment is a super audio CD player, the present invention is by no means limited to an optical disc player and is applicable to systems of other types adapted to handle 1-bit signals.

The present invention also provides a digital signal processing method for processing 1-bit digital audio signals of two systems weighted by "1" vs "−1" at high speed and having respective sampling frequencies showing a relationship of one equal to integer times of the other, the method comprising:

a mute pattern signal generating step of generating mute pattern signals of two systems having different respective sampling frequencies with a relationship of 1:(1/m) (m being an integer not smaller than 2), using respective mute patterns having weights of the same number, one taking the same value continuously by a unit of m samples;

the mute pattern signal generating step being adapted to link high speed sampling 1-bit digital audio signals of at least two systems by switching mute pattern signals of the two systems from one to the other in response to a switching signal, the double integral signals of minimum repetitive patterns of the mute pattern signals showing the same time average value.

The present invention further provides a digital signal processing method for processing 1-bit digital audio signals of two systems weighted by "1" vs "−1" at high speed and having the same sampling frequency, the method comprising:

a mute pattern signal detecting step of detecting a first mute pattern signal from the input 1-bit audio reproduced signal;

a double integrating step of performing an operation of double integration on the data of a cycle period of the first mute pattern signal detected in the mute pattern signal detecting step;

an average value detecting step of detecting the average value of the double integral values obtained in the double integrating step;

a mute pattern signal generating step of generating a second mute pattern signal having a sampling frequency same as that of the first mute pattern signal and showing an average value of the double integral values of the data of a cycle period getting to a predetermined value; and a switching step of switching from the input 1-bit audio reproduced signal to the second mute pattern signal generated in the mute pattern signal generating step;

the switching step being adapted to switch from the 1-bit audio reproduced signal to the second mute pattern signal at the timing of detection of the average value of the double integral values of the first mute pattern signal detected in the average value detecting step getting to the predetermined value.

What is claimed is:

1. A digital signal processing apparatus for processing 1-bit digital audio signals of at least two different systems weighted by "1" vs "−1" at high speed, the apparatus comprising:

mute pattern signal generating means for generating mute pattern signals of at least two different systems obtained by repetitively arranging a pattern with different weights of a same number; and control means for supplying a switching signal to the mute pattern signal generating means based on a switching request signal;

the mute pattern signal generating means being adapted to link high speed sampling 1-bit digital audio signals of at least two systems by switching mute pattern signals of the at least two systems from one to the other in response to the switching signal supplied from the control means, double integral signals of minimum repetitive patterns of the mute pattern signals showing a same time average value.

2. A digital signal processing apparatus for processing 1-bit digital audio signals of two systems weighted by "1" vs "−1" at high speed and having respective sampling frequencies showing a relationship of one equal to integer times of the other, the apparatus comprising:

mute pattern signal generating means for generating mute pattern signals of two systems having different respective sampling frequencies with a relationship of 1:(1/m) (m being an integer not smaller than 2), using respective mute patterns having weights of a same number, one taking a same value continuously by a unit of m samples; and control means for supplying a switching signal to the mute pattern signal generating means based on a switching request signal;

the mute pattern signal generating means being adapted to link high speed sampling 1-bit digital audio signals of two systems by switching mute pattern signals of the two systems from one to the other in response to the switching signal supplied from the control means, double integral signals of minimum repetitive patterns of the mute pattern signals showing a same time average value.

3. The apparatus according to claim 2, further comprising:

cross-fading means for cross-fading from a 1-bit signal with a first sampling frequency into a mute pattern signal with a sampling frequency equal to the first sampling frequency and subsequently from another mute pattern signal into a 1-bit signal with a second sampling frequency, the sampling frequency of the latter mute pattern signal being equal to the second sampling frequency.

4. The apparatus according to claim 3, wherein the mute pattern signal generating means links, in response to the switching signal supplied from the control means, the high speed sampling 1-bit digital audio signals by switching from the mute pattern with the first sampling frequency cross-faded from the 1-bit signal with the first sampling frequency by the cross-fading means to the mute pattern with the second sampling frequency cross-faded to the 1-bit signal with the second sampling frequency by the cross-fading means.

5. A digital signal processing apparatus for processing 1-bit digital audio signals of two systems weighted by "1" vs "−1" at high speed and having a same sampling frequency, the apparatus comprising:

mute pattern signal detecting means for detecting a first mute pattern signal from the input 1-bit audio reproduced signal;

double integrating means for performing an operation of double integration on the data of a cycle period of the first mute pattern signal detected by the mute pattern signal detecting means;

average value detecting means for detecting the average value of the double integral values obtained by the double integrating means;

mute pattern signal generating means for generating a second mute pattern signal having a sampling frequency same as that of the first mute pattern signal and showing an average value of the double integral values of the data of a cycle period getting to a predetermined value;

switching means for switching from the input 1-bit audio reproduced signal to the second mute pattern signal generated by the mute pattern signal generating means; and control means for controlling the switching operation of the switching means at the timing of detection of the average value of the double integral values of the first mute pattern signal detected by the average value detecting means getting to the predetermined value so as to switch from the 1-bit audio reproduced signal to the second mute pattern signal.

6. A digital signal processing method for processing 1-bit digital audio signals of at least two different systems weighted by "1" vs "−1" at high speed, the method comprising:

a mute pattern signal generating step of generating mute pattern signals of at least two different systems obtained by repetitively arranging a pattern with different weights of a same number;

the mute pattern signal generating step being adapted to link high speed sampling 1-bit digital audio signals of at least two systems by switching mute pattern signals of the at least two systems from one to the other in response to a switching signal, the double integral signals of minimum repetitive patterns of the mute pattern signals showing a same time average value.

* * * * *